United States Patent
Goel et al.

(10) Patent No.: US 11,895,566 B2
(45) Date of Patent: Feb. 6, 2024

(54) METHODS OF OPERATING A WIRELESS DATA BUS IN VEHICLE PLATOONS

(71) Applicant: QUALCOMM Incorporated, San Diego, CA (US)

(72) Inventors: Amit Goel, San Diego, CA (US); Mohammed Ataur Rahman Shuman, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 468 days.

(21) Appl. No.: 17/318,778

(22) Filed: May 12, 2021

(65) Prior Publication Data
US 2022/0369083 A1    Nov. 17, 2022

(51) Int. Cl.
| | |
|---|---|
| H04W 4/46 | (2018.01) |
| G08G 1/00 | (2006.01) |
| H04W 76/15 | (2018.01) |
| H04L 1/00 | (2006.01) |
| H04W 76/30 | (2018.01) |
| H04W 4/02 | (2018.01) |

(52) U.S. Cl.
CPC ............ *H04W 4/46* (2018.02); *G08G 1/22* (2013.01); *H04L 1/0003* (2013.01); *H04L 1/0009* (2013.01); *H04W 4/023* (2013.01); *H04W 76/15* (2018.02); *H04W 76/30* (2018.02)

(58) Field of Classification Search
CPC ....... H04W 4/46; H04W 76/15; H04W 76/30; H04W 4/023; H04L 1/0003; H04L 1/0009; G08G 1/22
See application file for complete search history.

(56) References Cited

U.S. PATENT DOCUMENTS

| | | | |
|---|---|---|---|
| 2005/0003844 A1* | 1/2005 | Nishiga | H04W 48/04 455/517 |
| 2007/0164896 A1* | 7/2007 | Suzuki | G01S 7/023 342/146 |
| 2012/0016553 A1 | 1/2012 | Bai | |

(Continued)

FOREIGN PATENT DOCUMENTS

| | | |
|---|---|---|
| WO | 2017164792 A1 | 9/2017 |
| WO | 2020035983 A1 | 2/2020 |

*Primary Examiner* — Tarek Elarabi
(74) *Attorney, Agent, or Firm* — The Marbury Law Group, PLLC

(57) ABSTRACT

Embodiments are disclosed that include systems and methods performed by a processor of a designated platoon vehicle, including establishing an out-of-band vehicle-to-vehicle (V2V) communication link with a target vehicle in response to determining a change in the quantity of vehicles included in the platoon is approved, wherein the out-of-band V2V communication link extends laterally more than a first V2V communication link with an initially-adjacent platoon vehicle, expanding the first V2V communication link for maintaining communications with the initially-adjacent platoon vehicle while changing a relative positioning between the designated platoon vehicle and the initially-adjacent platoon vehicle, establishing a second V2V communication link with the target vehicle, and ending the out-of-band V2V communication link in response to the target vehicle taking the place of the initially-adjacent platoon vehicle immediately adjacent to and either in front of or behind the designated platoon vehicle.

28 Claims, 16 Drawing Sheets

(56) References Cited

U.S. PATENT DOCUMENTS

| | | |
|---|---|---|
| 2016/0278065 A1 | 9/2016 | Kim et al. |
| 2018/0278385 A1 | 9/2018 | Wu et al. |
| 2018/0279096 A1 | 9/2018 | Wu et al. |
| 2020/0092685 A1* | 3/2020 | Fehrenbach .......... H04W 72/23 |
| 2020/0396782 A1* | 12/2020 | Russell ................... H04W 4/50 |

* cited by examiner

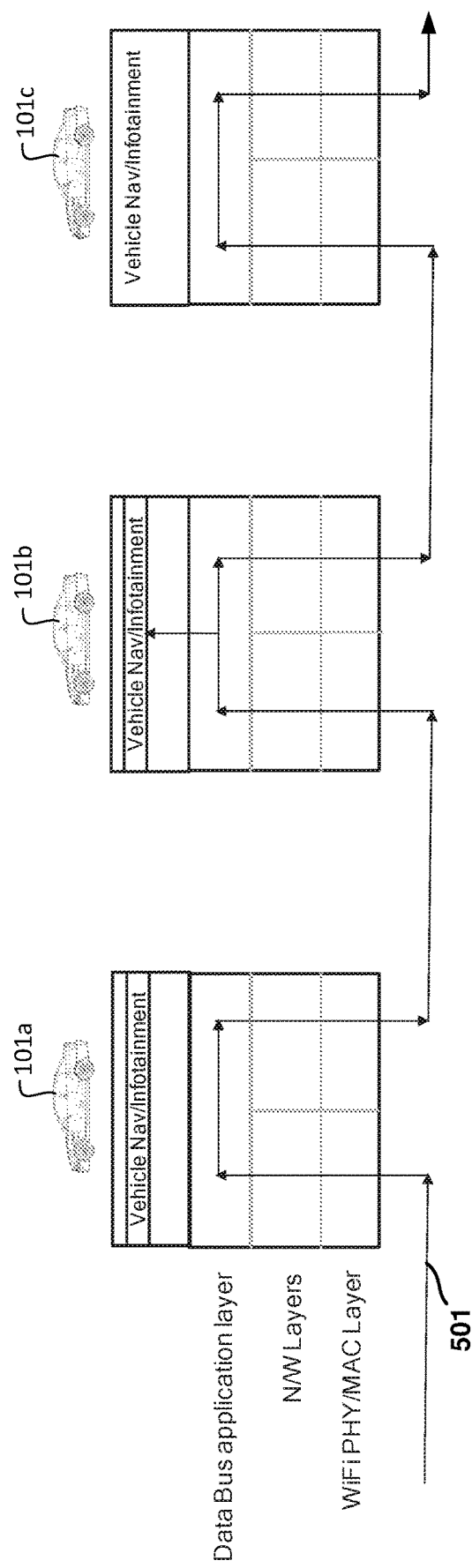

METHODS OF OPERATING A WIRELESS DATA BUS IN VEHICLE PLATOONS

BACKGROUND

Multiple regions of the world are developing standards for vehicle-based communication systems and functionality. For example, standards are being developed in the Institute of Electrical and Electronics Engineers (IEEE) and Society of Automotive Engineers (SAE) for use in North America, or in European Telecommunications Standards Institute (ETSI) and European Committee for Standardization (CEN) for use in Europe. Part of that system is the ability for a vehicle to broadcast Basic Safety Messages (BSM) in North America or Cooperative Awareness Messages in Europe, which other vehicles can receive and process to improve traffic safety. The processing of such BSM messages in the transmitting and receiving vehicles occurs in onboard equipment that provide vehicle-to-everything (V2X) functionality, which not only covers vehicle-to-vehicle (V2V) and vehicle-to-infrastructure (V2I) communications, but may also include vehicle-to-pedestrian (V2P) and vehicle-to-network (V2N) communications as well.

V2X and even just V2V communications using standard wireless spectrum tend to contribute to a very noisy communication environment, which leads to lower throughput and reliability concerns. Autonomous vehicles that use cellular vehicle-to-everything (C-V2X) communications often travel in platoons (i.e., traveling very closely together in a coordinated manner). Platooning vehicles tend to communicate more frequently with one another, with very time sensitive communications, because of the very real safety threat that exists if one vehicle changes speed or direction dramatically. Such intra-platoon communications can thus increase the volume of V2V traffic, increasing congestion on the V2X frequencies.

SUMMARY

Various aspects include systems and methods executed by a processor of a vehicle, such as an autonomous vehicle, a semi-autonomous vehicle, etc., for changing a quantity of vehicles in a platoon.

Some aspects may include establishing an out-of-band vehicle-to-vehicle (V2V) communication link with a target vehicle in response to determining a change in the quantity of vehicles included in the platoon is approved, in which the out-of-band V2V communication link extends laterally relative to a direction of travel of a designated platoon vehicle more than a first V2V communication link with an initially-adjacent platoon vehicle that is currently immediately adjacent the designated platoon vehicle and is traveling either in front of or behind the designated platoon vehicle, expanding the first V2V communication link for maintaining communications with the initially-adjacent platoon vehicle while changing a relative positioning between the designated platoon vehicle and the initially-adjacent platoon vehicle, establishing a second V2V communication link with the target vehicle, and ending the out-of-band communication link in response to the target vehicle taking the place of the initially-adjacent platoon vehicle immediately adjacent to and either in front of or behind the designated platoon vehicle.

In some aspects the target vehicle may not be a member of the platoon when the out-of-band V2V communication link is established. In some aspects, the target vehicle may be already a member of the platoon, may be traveling either in front of or behind the designated platoon vehicle, and may have indicated an intention to leave the platoon. In some aspects, expanding the first V2V communication link may include changing a modulation scheme of the first V2V communication link. In some aspects, expanding the first V2V communication link may include adjusting the first V2V communication link to widen a beam or lengthen an effective range of the first V2V communication link.

Some aspects may further include receiving a platoon member change message indicating a requested change in the quantity of vehicles in the platoon, in which determining the change in the quantity of vehicles included in the platoon is approved is in response to receiving the platoon member change message, and providing an indication to the initially-adjacent platoon vehicle that the target vehicle is joining the platoon. In some aspects, the designated platoon vehicle may use beam steering to establish and maintain the out-of-band V2V communication link. In some aspects, the first and second V2V communication links use a 60 GHz Wi-Fi frequency. In some aspects, the second V2V communication link may have the same effective range as the first V2V communication link had before expanding. In some aspects, at least one of the target vehicle and the designated platoon vehicle may use beam steering for the second V2V communication link. In some aspects, the designated platoon vehicle is either a lead vehicle or a trailing vehicle of the platoon. Some aspects may further include adjusting a power level of the first or second V2V communication links in response to receiving an indication that a signal power adjustment is warranted.

Further aspects include a vehicle having a processor configured with processor-executable instructions to perform operations of any of the methods summarized above. Further aspects include a collaborative V2V communication system for use in a vehicle including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device configured for use in a vehicle and to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 5A is a communication flow diagram of example communication exchanges in a platoon use narrow-band communication links according to some embodiments.

DETAILED DESCRIPTION

Figure 1A:
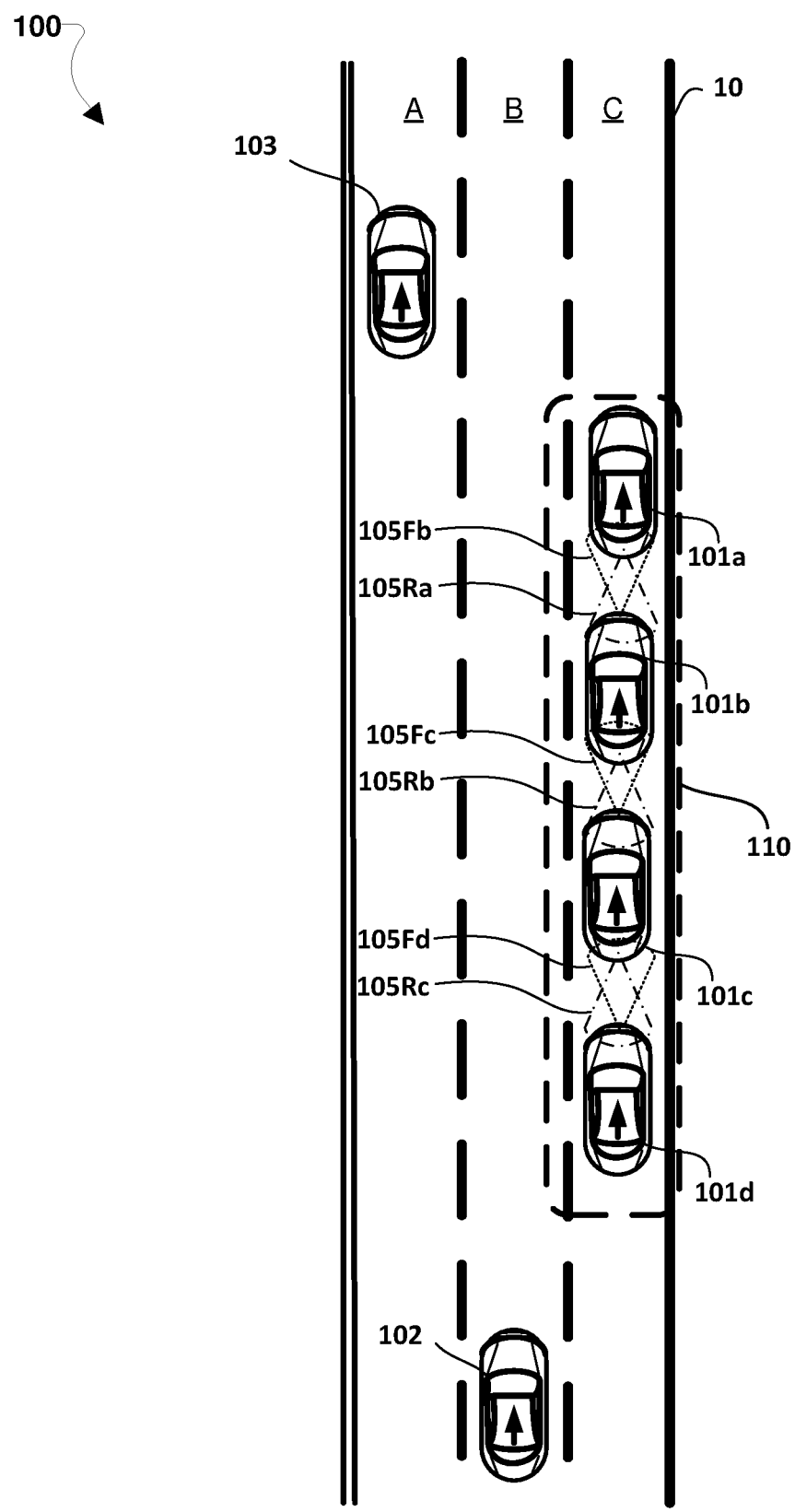
FIG. 1A is a schematic diagram illustrating several vehicles, including a platoon of vehicles, traveling on a roadway.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

In various embodiments, two or more vehicles operating as a platoon may collaborate to maintain highly-directional narrow-band communication links between platooning vehicles for handling intra-platoon V2V messages. Platoon member vehicles may be equipped with two or more beam-forming V2V antennas (e.g., one configured to direct signals in the forward-facing direction of the vehicle and another configured to direct signals in the rearward-facing direction of the vehicle), which may be used for transmitting and receiving the narrow-band communications. For example, platooning vehicles may transmit V2V messages using the 60 GHz Wi-Fi spectrum IEEE 802.11ay), which is generally unlicensed and will not generally reach beyond a vehicle ahead of or behind the transmitting vehicle. Although such beamed Wi-Fi message may be limited to line-of-sight, together the platooning vehicles may form a linked-chain configured to quickly convey messages and provide a wireless data bus for the whole platoon (referred to herein as the intra-platoon wireless data bus). The narrow-band signal formations in the forward and rearward directions should ensure that such wireless signals do not interfere with the communications of vehicles in other lanes. Also, by using narrow-band signal communications in a linked-chain network, intra-platoon messages effectively remain within the platoon, with only minor side-lobe emissions, thereby reducing V2V communication traffic. Credentials for client (i.e., platoon member vehicle) connections may be exchanged out of band via platoon formation protocols so that only a legitimate platoon member is able to join the wireless connections.

In overview, various embodiments include methods and systems for changing a quantity of vehicles in a platoon. In particular, one or more of the platooning member vehicles may use the intra-platoon wireless data bus, as well as another communication link, to coordinate adding or removing individual vehicles from the platoon. For example, at least one vehicle in the platoon that is designated to perform operations of various embodiments, sometimes referred to herein as a "designated platoon vehicle," may establish an out-of-hand V2V communication link with a vehicle that has indicated an intention to be added or removed from the platoon, which is sometimes referred to herein as a "target vehicle." In this way, the target vehicle may either already be a platoon member vehicle intent on leaving the platoon or another vehicle that is not part of the platoon but is intent on joining the platoon. The designated platoon vehicle may establish the out-of-hand V2V communication link in response to determining a change in the quantity of vehicles included in the platoon is approved. The out-of-hand V2V communication link may extend laterally relative to a direction of travel of the designated platoon vehicle more than the intra-platoon V2V communication links used for the intra-platoon wireless data bus. Thus, this out-of-hand V2V communication link may extend laterally relative to a direction of travel of the designated platoon vehicle more than a first V2V communication link with an initially-adjacent platoon vehicle that is immediately adjacent the designated platoon vehicle at that time and is traveling either in front of or behind the designated platoon vehicle. In addition, the designated platoon vehicle may expand the first V2V communication link for maintaining communications with the initially-adjacent platoon vehicle for changing a relative positioning between the designated platoon vehicle and the initially-adjacent platoon vehicle. The designated platoon vehicle may then establish a second V2V communication link with the target vehicle and then end both the out-of-band and the first V2V communication links in response to the target vehicle taking the place of the initially-adjacent platoon vehicle immediately adjacent to and either in front of or behind the designated platoon vehicle.

As another example, the target vehicle may not be a member of the platoon when the out-of-band V2V communication link is established. Alternatively, the target vehicle may already be a member of the platoon, is traveling either in front of or behind the designated platoon vehicle, and has indicated an intention to leave the platoon.

Expanding the first V2V communication link may include adjusting the first V2V communication link to widen a beam or lengthen an effective range of the first V2V communication link. As an example, expanding the first V2V communication link may include changing the modulation scheme of the first V2V communication link to widen and/or lengthen the effective range of the first. V2V communication link.

As another example, the method for changing a quantity of vehicles in a platoon may further include receiving a platoon member change message configured to indicate a change should be approved in the quantity of vehicles that should be included in the platoon. In addition, an indication may be provided to the initially-adjacent platoon vehicle that the target vehicle is joining the platoon.

As another example, the designated platoon vehicle may use beam steering to establish and maintain the out-of-band V2V communication link. Also, the first and second V2V communication links may use a 60 GHz Wi-Fi frequency. Further, the second V2V communication link may have the same effective range as the first V2V communication link had before expanding. In addition, at least one of the target vehicle and the designated platoon vehicle may use beam steering for the second V2V communication link. Further, the designated vehicle may be either the lead vehicle or the trailing vehicle of the platoon.

As used herein the terms "platoon" or "platooning" refer to two or more vehicle driving together in a relatively close formation. Platooning vehicles may operate with smaller than usual distances between vehicles and even optionally couple to one another (e.g., mechanically and/or electromagnetically).

Methods for changing how many vehicles are in a platoon may be coordinated by the vehicles organized and traveling within the platoon. Platooning employs methods to enable a group of vehicles to travel together in a collaborative manner. A platoon control plan may be used to organize, maintain, and/or control the group of vehicles in a formation. The platoon control plan may be determined by a single vehicle, which may be referred to as the "leader." Within the platoon, in accordance with the platoon control plan, each participating vehicle assumes a single position in the formation. The leader vehicle may coordinate the overall platoon movement. The other vehicles in the platoon (referred to herein as "followers") may follow directions provided by the leader, to the extent those directions do not conflict with other directions a vehicle is programmed to follow (e.g., destination directions may require a follower vehicle to leave the platoon). In addition, the leader vehicle may coordinate the addition of new vehicles to the platoon. However, the leader vehicle need not be the lead vehicle in the platoon. Platooning allows the vehicles to achieve a number of beneficial results, including increased fuel efficiency, congestion efficiency, collision risk mitigation, freeing the driver(s) to focus attention away from the road, and other benefits.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile device. The proximity of the SOCs facilitates high speed communications and the sharing of memory and resources.

Autonomous and semi-autonomous vehicles, such as cars, trucks, buses, etc., are becoming a reality on both highways and city streets. Autonomous and semi-autonomous vehicles typically include a plurality of sensors, including cameras, radar, and lidar, that collect information about the environment surrounding the vehicle. For example, such collected information may enable the vehicle to recognize the roadway, identify objects to avoid, and track the movement and future position of other vehicles to enable fully or partially autonomous navigation.

As used in this application, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

For ease of reference, some of the embodiments are described herein as being performed by a designated platoon vehicle using one or more V2V communication links. However, it should be understood that various embodiments encompass any vehicle configured with any or all of the V2V-Based communication standards, messages, or technologies. In addition, the embodiments described herein discuss onboard equipment to perform V2V communications. System participant equipment may broadcast information to other system participant equipment. For example, a vehicle may contain on-board/in-dash equipment and sensors that report on vehicle conditions (e.g., location, orientation, speed, dimensions, etc.). The processor contained in the in-dash/onboard unit or mobile device may be considered the platoon member vehicle processor.

In various embodiments, a vehicle interested in joining a platoon at a specific location relative to the platoon may transmit a wireless message requesting to join the platoon. The platoon vehicle such as the lead vehicle or any other designated vehicle decide whether to allow the interested vehicle to join the platoon in response to receiving the request message. Based on some predetermined criteria, the designated vehicle may determine whether the join request should be allowed. In response to determining the join request should be allowed, the designated vehicle may determine which two consecutive platoon vehicles are nearest an insertion point for the requesting vehicle. The designated vehicle may send messages to the determined two consecutive platoon vehicles providing instructions to make space for the requesting vehicle by increase the distance between the two consecutive platoon vehicles. The messaging between the designated vehicle and the determined two consecutive platoon vehicles may be out-of-band and may provide the two determined consecutive platoon vehicles with information needed regarding the joining vehicle, such as position, speed, etc. Alternatively, the designated vehicle may use the existing communication bus to communicate information regarding the joining vehicle. However, if done using the existing communication bus, the two determined consecutive platoon vehicles may need to be identified so that those vehicles know they must act on the message. In response to the instruction message(s), the determined two consecutive platoon vehicles may increase a power level of transmissions of the intra-platoon V2V communication link between them. For example, if the determined two consecutive platoon vehicles are traveling 20 feet apart and that distance needs to be increased to 40 feet, a power level of the V2V communication link may be increased by 10 dB. The platoon vehicles may use predetermined values from a lookup table for determining the decibel level of signal to use for V2V communications depending upon a current or projected distance between vehicles. The increased power level of the V2V communication link may ensure that the communication bus of the platoon is not broken when the spacing between the pair of platoon vehicles increases.

Once the V2V communication link range is extended, an out-of-band communication link may be established with the vehicle interested in joining the platoon. Each of the determined two consecutive platoon vehicles may establish separate out-of-band communication links with the vehicle interested in joining the platoon. When using a communication frequency such as 60 GHz for the out-of-band communications, the platoon vehicles may use directional beaming to steer communications toward the joining vehicle to ensure establishment of a successful communication link.

Communication link power adjustments may also be feedback-based by adjusting the power level of transmissions if either of two communicating vehicles detects a signal degradation or loss due to weather or other communication difficulties. Information regarding signal loss or reduced signal strength may be communicated so that one or both vehicles may increase power used in the communication link or potentially use beam steering to improve the communication link.

Various embodiments may be implemented within a variety of platoon vehicles. FIG. 1A illustrates an environment 100 that includes an example platoon 110 comprising platoon member vehicles 101a-101d traveling together on a roadway 10. With reference to FIG. 1A, the platoon member vehicles 101a-101d may be traveling in close proximity to one another and within the same driving lane C of the roadway 10, as is common with autonomous vehicle platoons. In addition, the roadway 10 may include one or more additional vehicles 102, 103 that are not part of the platoon (i.e., non-platoon member vehicles 102, 103) but happen to be traveling in the vicinity of the platoon.

In accordance with various embodiments, communications between platoon member vehicles 101a-101d, which may be frequent and extremely time sensitive, may occur using narrow-hand V2V communication links. Each of the platoon member vehicles 101a-101d may be configured to emit and receive the narrow-band V2V radio frequency (RF) signals in a forward and rearward direction. For example, the rear of each of the platoon member vehicles 101a-101d may be configured to act as a 60 GHz Wi-Fi access point (AP) and the front of each of the platoon member vehicles 101a-101d may be configured to act as a 60 GHz Wi-Fi client station (STA). Thus, each of the platoon member vehicles 101a-101d may have a wireless transceiver on each of the front and rear ends of the vehicles or other locations that may direct Wi-Fi signals forward and rearward. To establish and maintain a wireless communication bus in a forward direction between the platoon member vehicles 101a-101d, the second, third, and fourth platoon member vehicles 101b, 101c, 101d may each emit forward RF signals 105Fb, 105Fc, 105Fd, respectively, that are received by the first, second, and third platoon member vehicles 101a, 101b, 101c, respectively. In addition, a wireless communication bus in a rearward direction may be established and maintained by the first, second, and third platoon member vehicles 101a, 101b, 101c may each emit rearward RF signals 105 Ra, 105Rb, 105Rc, respectively that are received by the second, third, and fourth platoon member vehicles 101b, 101c, 101d, respectively. The use of narrow-band V2V communication links in a specific direction may keep the communication spectrum clean for broadcasting communications outside the platoon. Also, such a configuration may forms a bi-directional wireless communication bus, using for example Layer 2 (L2) and/or Layer 3 (L3) protocols to relay data packets to the next vehicle in the chain.

In various embodiments, the platoon vehicles may additionally avoid adjacent lane channel interference by adopting a lane specific channel allocation scheme. Thus, consideration may be given to specifically what channel is being used for each lane so that communication in adjacent lanes uses different channels. For example, odd numbered lanes (e.g., A, C) may use one channel, while even numbered lanes (e.g., B) may use one different channel. In this way, no two adjacent lanes should use the same or adjacent channels in order to avoid interference. One scheme for avoiding channel interference has East and North-bound lanes using alternating even number channels, West and Sound-bound lanes may use alternating odd number channels.

In various embodiments, the platoon vehicles may proactively adjust wireless beam transmissions with beam steering to ensure a strong communication link is maintained between vehicles. In this way, if either vehicle detects a weakening or loss of communication signal, that vehicle may attempt beam steering or signal power increases in order to maintain a strong communication link. Additionally, one or both vehicles forming a communication link may proactively provide position and/or trajectory information (steering adjustments may be announced using the bus before initiated), which can be used for the beam steering, in order to maintain a robust communication link. In this way, the entire platoon may continuously communicate position and trajectory information along the communication bus so each vehicle can steer a communication beam accordingly. In addition, such beam steering and position/trajectory information may be used for communications with a joining vehicle. In addition, optimized beam steering and/or power levels may be shared using the communication bus so that other adjacent platoon vehicles may use such information in order to optimize their own bus communication link. For example, a pair of lead vehicles or vehicles toward the front of a platoon may convey changes to communication settings that are tied to navigational or platoon formation changes that vehicles further back will soon experience. In this way, vehicles towards the front of the platoon may warn rear vehicles of up-coming condition changes, whether with regard to communications and/or navigation controls.

Figure 1B:
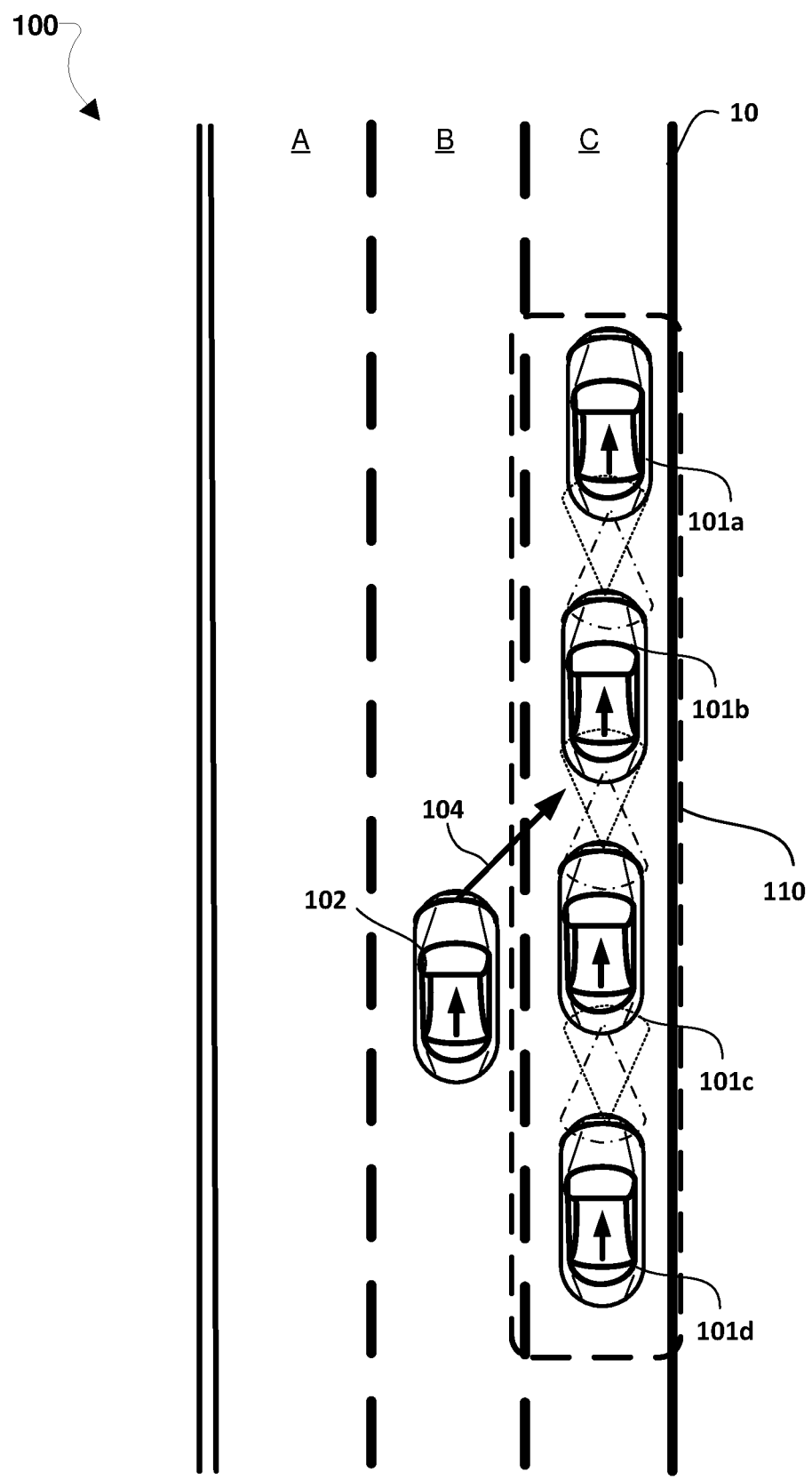
FIGS. 1B-1D are schematic diagrams illustrating a method for changing a quantity of vehicles in a platoon for implementing various embodiments.

Various embodiments may include additional procedures that ensure the intra-platoon wireless data bus is maintained while accommodating circumstances in which a vehicle is being added and/or leaves the platoon. FIG. 1B illustrates the environment 100 in which now one of the non-platoon member vehicles 102 is requesting to join the platoon 110. With reference to FIGS. 1A-1B, when a vehicle, such as the non-platoon member vehicle 102, seeks to join the platoon 110, that non-platoon member vehicle 102 may transmit a platoon member change message 104, which requests that the non-platoon member vehicle 102 join the platoon 110. The request to join the platoon may be initiated by the non-platoon member vehicle 102 or alternatively by a platoon leader asking the non-platoon member vehicle 102 to join. The platoon member change message 104 may be carried by an out-of-band signal transmitted at a different frequency than the intra-platoon V2V messages. Also, any of the platoon member vehicles 101a-101d may receive the platoon member change message 104 and pass the message along to the leader of the platoon 110 (e.g., vehicle 101a) via the intra-platoon wireless data bus. The platoon leader may receive the platoon member change message, which may indicate a requested change in the quantity of vehicles in the platoon. In particular, in the circumstance illustrated in FIG. 1B the requested change adds the non-platoon member vehicle 102 (i.e., one vehicle) to the platoon. Alternatively, if a platoon member vehicle needs to leave the platoon, that vehicle may transmit a platoon member change message to the platoon leader indicating the vehicle needs to leave.

Upon receipt of the platoon member change message 104, the platoon leader may determine whether the change in the quantity of vehicles should be approved. Various considerations may be taken into account when determining whether to approve the addition of a vehicle to the platoon or removal of a vehicle from the platoon. For example, if the platoon can accommodate an additional vehicle and is not already at maximum capacity, a request to join may be approved.

Figure 1C:
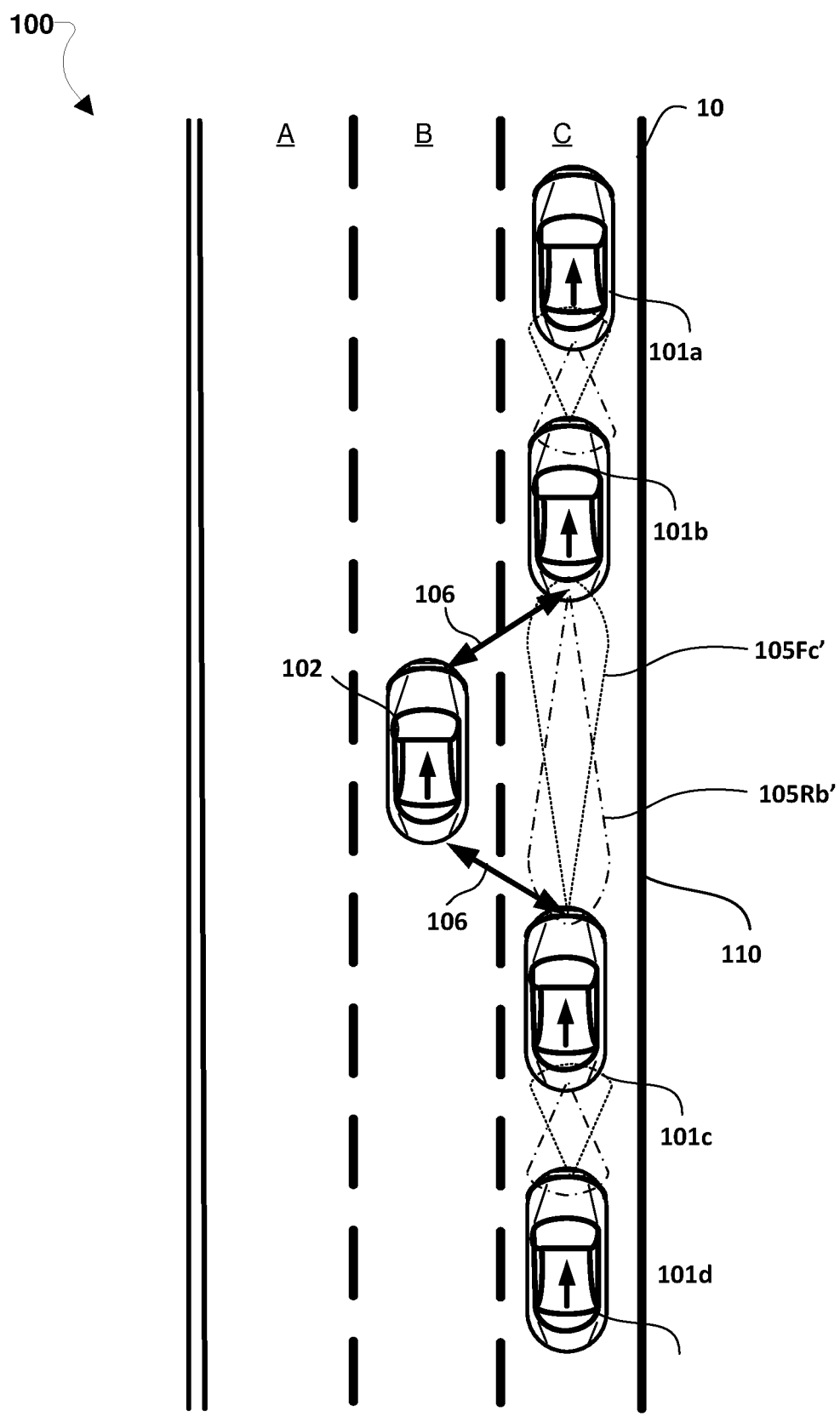

FIG. 1C illustrates the environment 100 in which the non-platoon member vehicle 102 has been approved to join the platoon 110. With reference to FIGS. 1A-1C, in response to the platoon leader (e.g., 101a) determining that the change in the quantity of vehicles included in the platoon is approved, the platoon leader may instruct two selected consecutive platoon vehicles closest to the target vehicle to initiate a platoon join routine. The platoon join routine may initially include establishing out-of-band V2V communication links 106 with the target vehicle (i.e., the non-platoon member vehicle 102); expanding the narrow-band V2V communication links (i.e., the first V2V communication links 105Rb, 105Fc) between the two selected consecutive platoon vehicles 101b, 101c; and increasing the space between the two selected consecutive platoon vehicles to make space for the target vehicle. Each of the two selected consecutive platoon vehicles may be referred to herein as a "designated platoon vehicle" since those vehicles may perform the bulk of the platoon join routine. The platoon leader may be one of the two designated platoon vehicles that performs the bulk of the platoon join routine. Also, the platoon leader may occupy any position in the platoon, including the front, middle, and rear-most positions therein.

Establishing the out-of-band V2V communication links 106 may use alternate wider range wireless channels (e.g., C-V2X/4G/5G). Also, each of the separate out-of-band V2V communication links 106 may convey messages that communicate control information to the target vehicle and/or the two selected consecutive platoon vehicles regarding the platoon join routine. For example, the messages may include information about the position, speed, trajectory, planned movements, and other details about the communicating vehicles. One or both of the designated platoon vehicles may use beam steering to establish and maintain the out-of-band V2V communication link.

Expanding the narrow-hand V2V communication links (i.e., first communication links) between the two selected consecutive platoon vehicles (e.g., 105Rb and 105Fc) may be performed by changing the modulation scheme (MCS) of the narrow-band communication links to ensure the link remains stable as the gap between the two selected consecutive platoon vehicles increases to make room for the target vehicle. Expanding the narrow-hand V2V communication links may include adjusting the narrow-hand V2V communication links to widen a beam or lengthen an effective range of the narrow-hand V2V communication link.

Increasing the space between platoon member vehicles to make room for the target vehicle may be performed by changing a relative speed of the two selected consecutive platoon vehicles. Also, increasing the space between the two selected consecutive platoon vehicles may start before, during, or after establishing the out-of-band V2V communication links 106 and/or expanding the narrow-band V2V communication links.

Figure 1D:
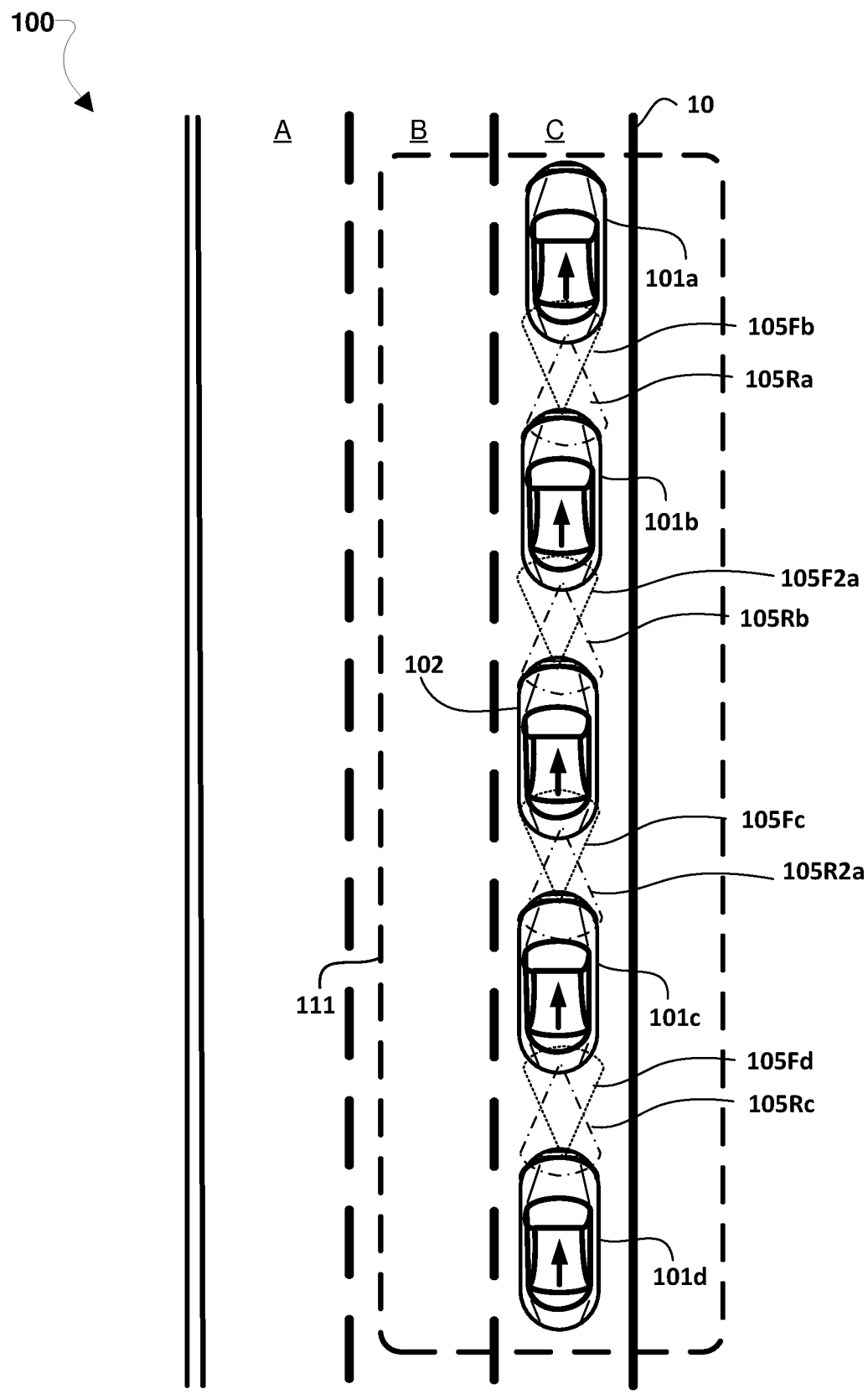

FIG. 1D illustrates the environment 100 in which the target vehicle 102 is in position for joining the platoon 110. With reference to FIGS. 1A-1D, in response to successfully completing the initial platoon join routine described with regard to FIG. 1C, the target vehicle 102 may move into the space made between the two designated platoon vehicles 101b, 101c. In this way, the target vehicle 102 will align itself with the rearward and forward RF signals 105Rb, 105Fc of the two designated platoon vehicles 101b, 101c, respectively. Once the target vehicle 102 is aligned by the designated platoon vehicles 101b, 101c (i.e., in the same lane and between them), the target vehicle 102 may start receiving the rearward and forward RF signals 105Rb, 105Fc. In addition, the target vehicle 102 may establish new narrow-hand V2V communication links 105F2a, 105R2a (i.e., second V2V communication links) with the designated vehicles 101b, 101c, respectively.

Once the target vehicle 102 has fully moved into the opening between the designated vehicles 101b, 101c, the target vehicle 102 may receive and connect with the RF signals 105Rb, 105Fc from the designated platoon vehicles ahead 101b and behind 101c. Once connected with the RF signals 105Rb, 105Fc, each of the designated vehicles 101b, 101c may return the expanded V2V communication links (e.g., 105Rb', 105Fc') to their previous short-range state (e.g., 105Rb, 105Fc). Thus, a new linked-chain network is established, which is expanded from the previous one by one vehicle. In addition, in response to the target vehicle 102 getting into its designated position in the platoon and lengthening the bi-directional wireless communication bus of the platoon, the out-of-band V2V communication links (e.g., 106) may be terminated (i.e., ended).

In various embodiments, a routine that is the reverse of the join routine described above may be used as a departure routine when a platoon member vehicle leaves the platoon.

Figure 2A:
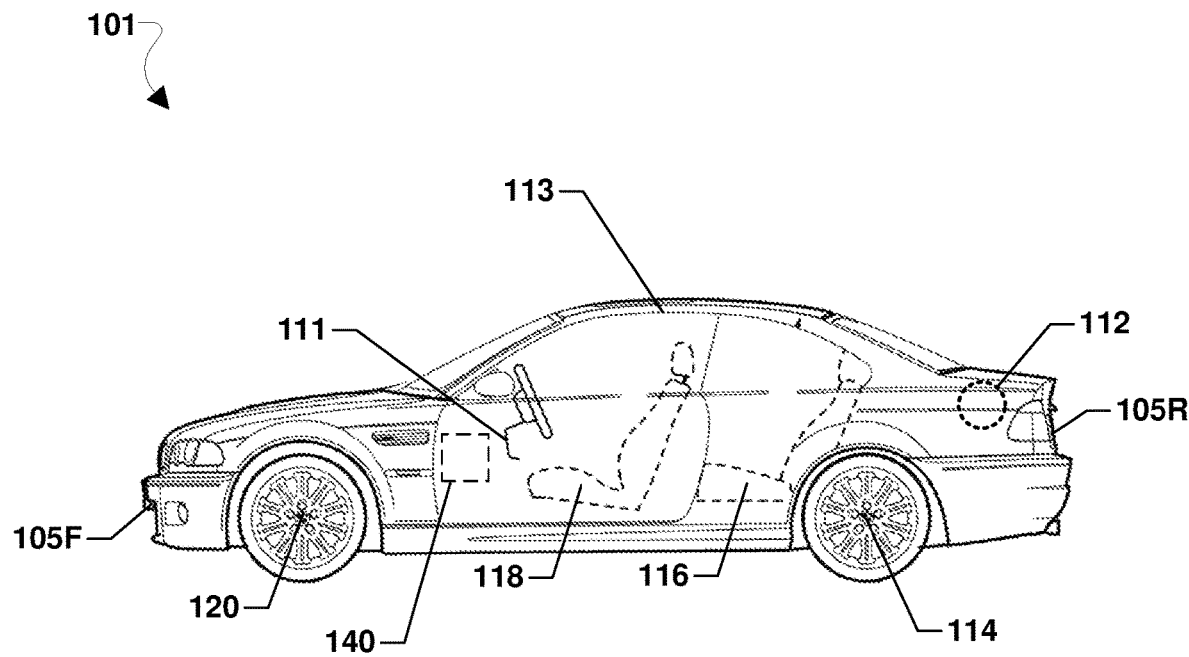
FIGS. 2A and 2B are component block diagrams illustrating a vehicle suitable for implementing various embodiments.
Figure 2B:
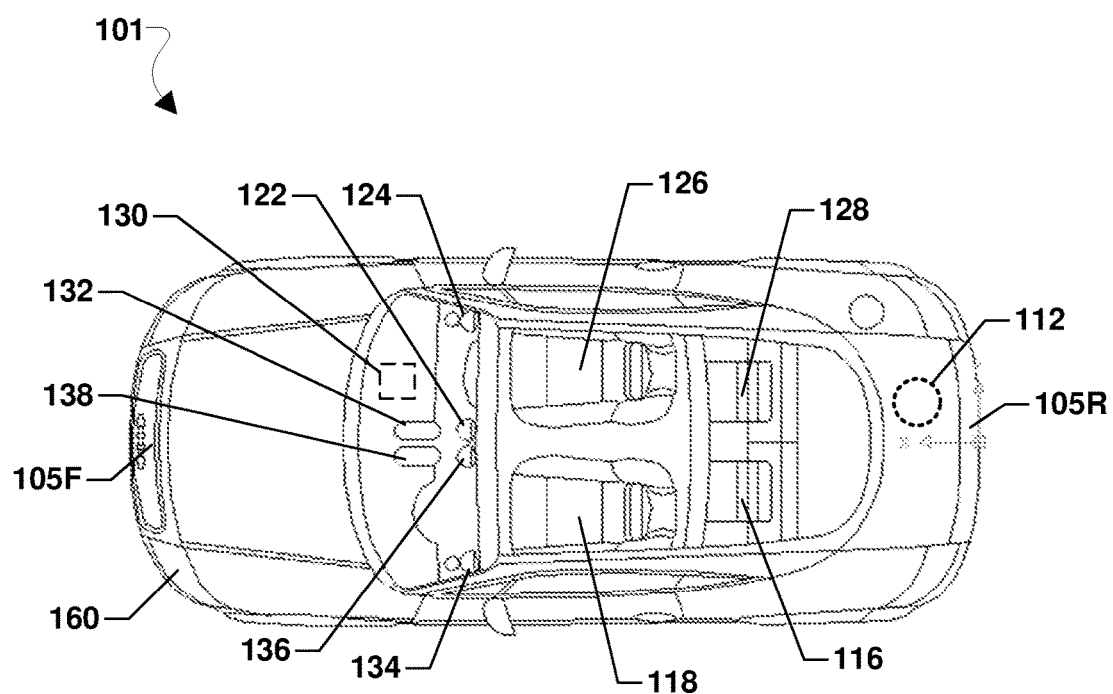

Various embodiments may be implemented within a variety of vehicles, an example of which in vehicle 101 is illustrated in FIGS. 2A and 2B. With reference to FIGS. 2A and 2B, the vehicle 101 may represent any one or more of the platoon member vehicles 101a-101d described with regard to FIGS. 1A-1D. In various embodiments, the vehicle 101 may include a control unit 140 and a plurality of sensors 111-138, including satellite geo-positioning system receivers 113, occupancy sensors 112, 116, 118, 126, 128, tire pressure sensors 114, 120, cameras 122, 136, microphones 124, 134, impact sensors 130, radar 132, and lidar 138. The plurality of sensors 111-138, disposed in or on the vehicle, may be used for various purposes, such as autonomous and semi-autonomous navigation and control, crash avoidance, position determination, etc., as well to provide sensor data regarding objects and people in or on the vehicle 101. The sensors 111-138 may include one or more of a wide variety of sensors capable of detecting a variety of information useful for navigation and collision avoidance. Each of the sensors 111-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geo-positioning system sensors 113, control input sensors 111, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured to direct signals from one or both of the narrow-hand Wi-Fi emitters 105F, 105R in accordance with various embodiments. Additionally, the control unit 140 may have a default setting for one or both of the narrow-hand Wi-Fi emitters 105F, 105R, such as a no-directing setting or a setting that automatically directs one or both of the narrow-band Wi-Fi emitters 105F, 105R to follow the steering wheel. The default setting may be followed when the control unit 140 is not actively directing one or both of the narrow-band Wi-Fi emitters 105F, 105R.

The vehicle control unit 140 may be configured with processor-executable instructions to perform navigation and collision avoidance operations using information received from various sensors, particularly the cameras 122, 136. In some embodiments, the control unit 140 may supplement the processing of camera mages using distance and relative position (e.g., relative hearing angle) that may be obtained from radar 132 and/or lidar 138 sensors. The control unit 140 may further be configured to control steering, braking, and speed of the vehicle 101 when operating in an autonomous or semi-autonomous mode using information regarding other vehicles determined using various embodiments.

Figure 2C:
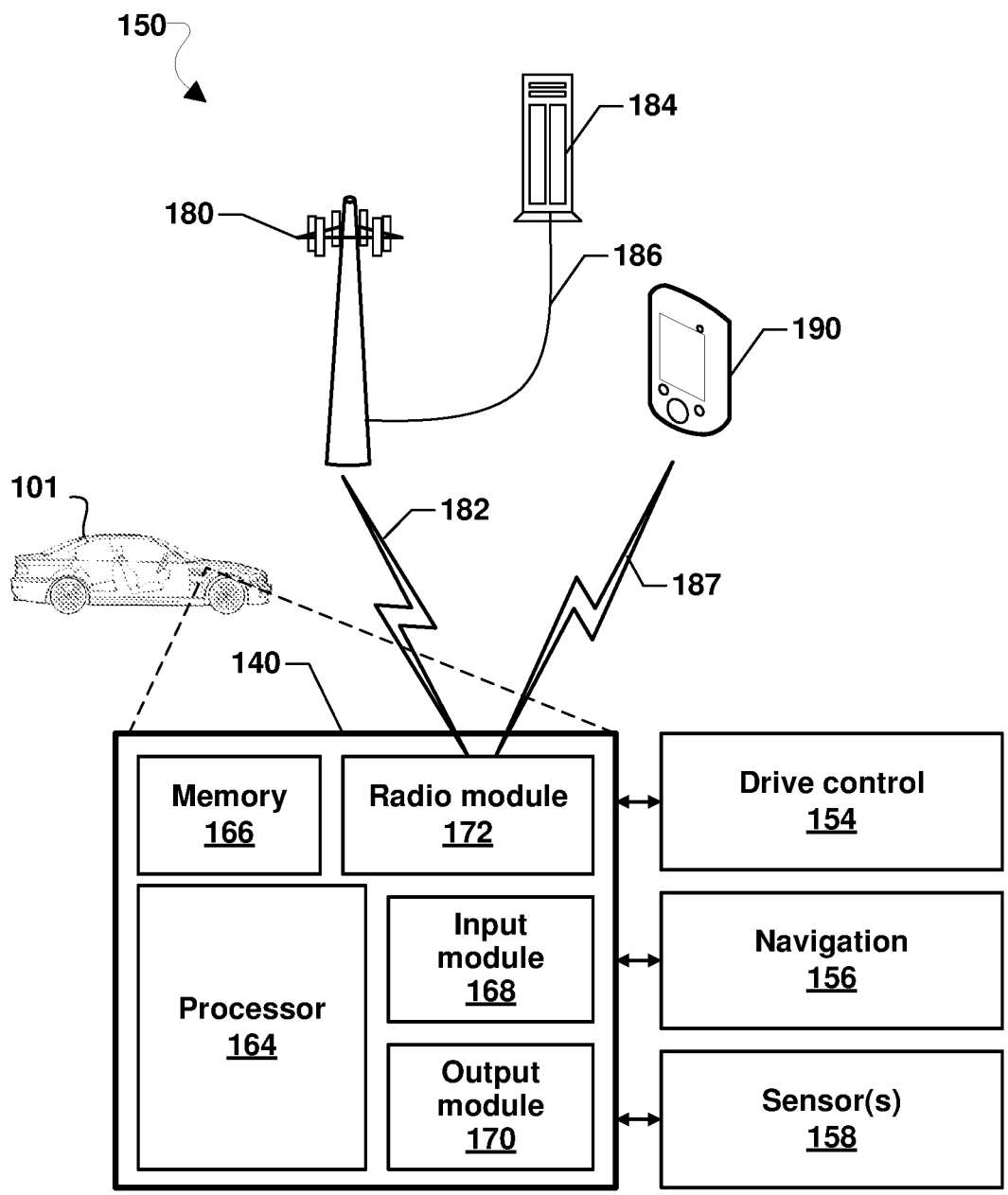
FIG. 2C is a component block diagram illustrating components of a vehicle suitable for implementing various embodiments.

FIG. 2C is a component block diagram illustrating a communication system 150 of components and support systems suitable for implementing various embodiments. With reference to FIGS. 1A-2C, a vehicle 101 may include a control unit 140, which may include various circuits and devices used to control the operation of the vehicle 101. In the example illustrated in FIG. 2C the control unit 140 includes a processor 164, memory 166, an input module 168, an output module 170 and a radio module 172. The control unit 140 may be coupled to and configured to control drive control components 154, navigation components 156, and one or more sensors 158 of the vehicle 101. The processor 164 that may be configured with processor-executable instructions to control maneuvering, navigation, and/or other operations of the vehicle 101, including operations of various embodiments. The processor 164 may be coupled to the memory 166.

The radio module 172 may be configured for wireless communication. The radio module 172 may exchange signals (e.g., command signals for controlling maneuvering, signals from navigation facilities, etc.) via the communication link 182 with a network transceiver (e.g., the base station and/or network 180), and may provide the signals to the processor 164 and/or the navigation components 156. The base station and its network 180 may in-turn be coupled to a network server 184 via a communication link 186. In some embodiments, the radio module 172 may enable the vehicle 101 to communicate with a wireless communication device 190 through the wireless communication link 187. The wireless communication link 187 may be a bidirectional or unidirectional communication link, and may use one or more communication protocols. In some embodiments, the radio module 172 may enable the vehicle 101 to communicate with another vehicle (e.g., 101b) through a wireless communication link 192. The wireless communication link 192 may be a bidirectional or unidirectional communication link, and may use one or more communication protocols, as described.

The input module 168 may receive sensor data from one or more vehicle sensors 158 as well as electronic signals from other components, including the drive control components 154 and the navigation components 156. The output module 170 may communicate with or activate various components of the vehicle 101, including the drive control components 154, the navigation components 156, and the sensor(s) 158.

The control unit 140 may be coupled to the drive control components 154 to control physical elements of the vehicle 101 related to maneuvering and navigation of the vehicle, such as the engine, motors, throttles, steering elements, flight control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices haptic devices, audible alarms, etc.), and other similar devices.

The control unit 140 may be coupled to the navigation components 156, and may receive data from the navigation components 156 and be configured to use such data to determine the present position and orientation of the vehicle 101, as well as an appropriate course toward a destination. The navigation components 156 may include or be coupled to a global navigation satellite system (GNSS) receiver system (e.g., one or more Global Positioning System (GPS) receivers) enabling the vehicle 101 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 101 to navigate and maneuver. The processor 164 and/or the navigation components 156 may be configured to communicate with a network element such as a server in a communication network (e.g., the network 180) via the wireless communication link 182, 187 to receive commands to control maneuvering, receive data useful in navigation, provide real-time position reports, and assess other data.

The control unit 140 may be coupled to one or more sensors 158. The sensor(s) 158 may include the sensors (e.g., 111-138) as described with respect to FIGS. 2A and 2B, and may the configured to provide a variety of data to the processor 164.

While the control unit 140 is described as including separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of navigation and collision avoidance using local dynamic map (LDM) data when installed in a vehicle.

Figure 3A:
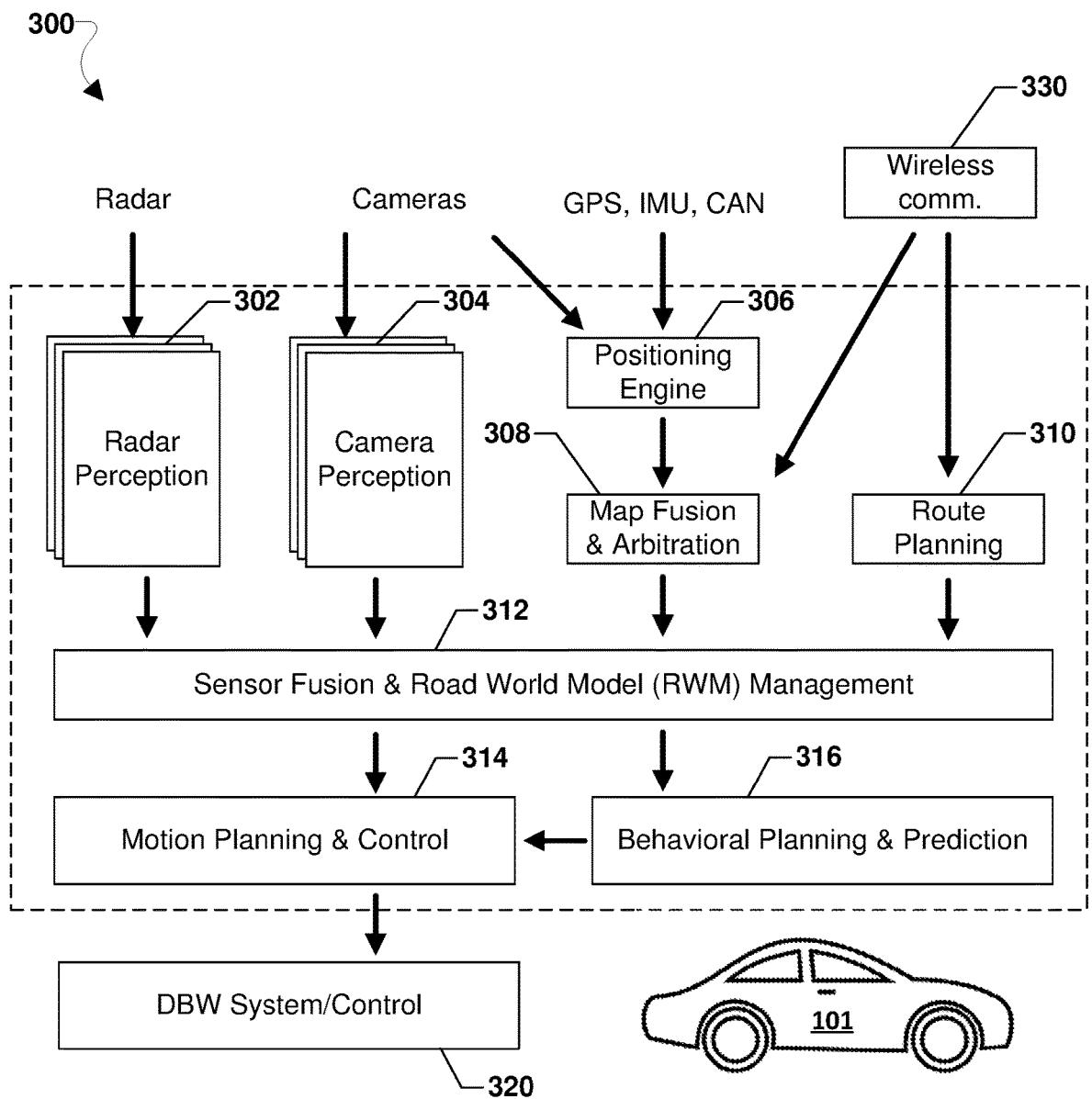
FIG. 3A is a component block diagram illustrating components of an example vehicle management system suitable for implementing various embodiments.

FIG. 3A is a component block diagram illustrating components of an example platoon management system 300. The platoon management system 300 may include various subsystems, communication elements, computational elements, computing devices or units which may be utilized within a vehicle 101. With reference to FIGS. 1A-3A, the various computational elements, computing devices or units within the platoon management system 300 may be implemented within a system of interconnected computing devices (i.e., subsystems), that communicate data and commands to each other (e.g., indicated by the arrows in FIG. 3A). In some implementations, the various computational elements, computing devices or units within platoon management system 300 may be implemented within a single computing device, such as separate threads, processes, algorithms or computational elements. Therefore, each subsystem/computational element illustrated in FIG. 3A is also generally referred to herein as "layer" within a computational "stack" that constitutes the platoon management system 300. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The platoon management system 300 may include a radar perception layer 302, a camera perception layer 304, a positioning engine layer 306, a map fusion and arbitration layer 308, a route planning layer 310, sensor fusion and road world model (RWM) management layer 312, motion planning and control layer 314, and behavioral planning and prediction layer 316. The layers 302-316 are merely examples of some layers in one example configuration of the platoon management system 300. In other configurations, other layers may be included, such as additional layers for other perception sensors (e.g., LIDAR perception layer, etc.), additional layers for planning and/or control, additional layers for modeling, etc., and/or certain of the layers 302-316 may be excluded from the platoon management system 300. Each of the layers 302-316 may exchange data, computational results and commands as illustrated by the arrows in FIG. 3A. Further, the platoon management system stack 300 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The platoon management system 300 may output vehicle control commands or signals to the drive by wire (DBW) system/control unit 320, which is a system, subsystem or computing device that interfaces directly with vehicle steering, throttle and brake controls. The configuration of the platoon management system 300 and DBW system/control unit 320 illustrated in FIG. 3A is merely an example configuration and other configurations of a vehicle management system and other vehicle components may be used. As an example, the configuration of the platoon management system 300 and DBW system/control unit 320 illustrated in FIG. 3A may be used in a vehicle configured for autonomous or semi-autonomous operation while a different configuration may be used in a non-autonomous vehicle.

The radar perception layer 302 may receive data from one or more detection and ranging sensors, such as radar (e.g., 132) and/or lidar (e.g., 138), and process the data to recognize and determine locations of other vehicles and objects within a vicinity of the vehicle 101. The radar perception layer 302 may include use of neural network processing and artificial intelligence methods to recognize objects and vehicles, and pass such information on to the sensor fusion and RWM management layer 312.

The camera perception layer 304 may receive data from one or more cameras, such as cameras (e.g., 122, 136), and process the data to recognize and determine locations of other vehicles and objects within a vicinity of the vehicle 100. The camera perception layer 304 may include use of neural network processing and artificial intelligence methods to recognize objects and vehicles, and pass such information on to the sensor fusion and RWM management layer 312.

The positioning engine layer 306 may receive data from various sensors and process the data to determine a position of the vehicle 101. The various sensors may include, but is not limited to, GPS sensor, an IMU, and/or other sensors connected via a CAN bus. The positioning engine layer 306 may also utilize inputs from one or more cameras, such as cameras (e.g., 122, 136) and/or any other available sensor, such as radars, LIDARs, etc.

The platoon management system 300 may include or be coupled to a vehicle wireless communication subsystem 330. The wireless communication subsystem 330 may be configured to communicate with other vehicle computing devices and highway communication systems, such as via V2V communication links and/or to remote information sources, such as cloud-based resources, via cellular wireless communication systems, such as 5G networks. In various embodiments, the wireless communication subsystem 330 may communicate with other V2X system participants via wireless communication links to receive V2X messages as well as sensor data that may support a conclusion that a platoon condition is detected.

The map fusion and arbitration layer 308 may access sensor data received from other V2X system participants and receive output received from the positioning engine layer 306 and process the data to further determine the position of the vehicle 101 within the map, such as location within a lane of traffic, position within a street map, etc. sensor data may be stored in a memory (e.g., memory 166). For example, the map fusion and arbitration layer 308 may convert latitude and longitude information from GPS into locations within a surface map of roads contained in the sensor data. GPS position fixes include errors, so the map fusion and arbitration layer 308 may function to determine a best guess location of the vehicle within a roadway based upon an arbitration between the GPS coordinates and the sensor data. For example, while GPS coordinates may place the vehicle near the middle of a two-lane road in the sensor data, the map fusion and arbitration layer 308 may determine from the direction of travel that the vehicle is most likely aligned with the travel lane consistent with the direction of travel. The map fusion and arbitration layer 308 may pass map-based location information to the sensor fusion and RWM management layer 312.

The route planning layer 310 may utilize sensor data, as well as inputs from an operator or dispatcher to plan a route to be followed by the vehicle 101 to a particular destination. The route planning layer 310 may pass map-based location information to the sensor fusion and RWM management layer 312. However, the use of a prior map by other layers, such as the sensor fusion and RWM management layer 312, etc., is not required. For example, other stacks may operate and/or control the vehicle based on perceptual data alone without a provided map, constructing lanes, boundaries, and the notion of a local map as perceptual data is received.

The sensor fusion and RWM management layer 312 may receive data and outputs produced by the radar perception layer 302, camera perception layer 304, map fusion and arbitration layer 308, and route planning layer 310, and use some or all of such inputs to estimate or refine the location and state of the vehicle 101 in relation to the road, other vehicles on the road, and other objects within a vicinity of the vehicle 101. For example, the sensor fusion and RWM management layer 312 may combine imagery data from the camera perception layer 304 with arbitrated map location information from the map fusion and arbitration layer 308 to refine the determined position of the vehicle within a lane of traffic. As another example, the sensor fusion and RWM management layer 312 may combine object recognition and imagery data from the camera perception layer 304 with object detection and ranging data from the radar perception layer 302 to determine and refine the relative position of other vehicles and objects in the vicinity of the vehicle. As another example, the sensor fusion and RWM management layer 312 may receive information from vehicle-to-vehicle (V2V) communications (such as via the CAN bus) regarding other vehicle positions and directions of travel, and combine that information with information from the radar perception layer 302 and the camera perception layer 304 to refine the locations and motions of other vehicles. The sensor fusion and RWM management layer 312 may output refined location and state information of the vehicle 101, as well as refined location and state information of other vehicles and objects in the vicinity of the vehicle, to the motion planning and control layer 314 and/or the behavior planning and prediction layer 316.

As a further example, the sensor fusion and RWM management layer 312 may use dynamic traffic control instructions directing the vehicle 101 to change speed, lane, direction of travel, or other navigational element(s), and combine that information with other received information to determine refined location and state information. The sensor fusion and RWM management layer 312 may output the refined location and state information of the vehicle 101, as well as refined location and state information of other vehicles and objects in the vicinity of the vehicle 100, to the motion planning and control layer 314, the behavior planning and prediction layer 316 and/or devices remote from the vehicle 101, such as a data server, other vehicles, etc., via wireless communications, such as through C-V2X connections, other wireless connections, etc.

As a further example, the sensor fusion and RWM management layer 312 may monitor perception data from various sensors, such as perception data from a radar perception layer 302, camera perception layer 304, other perception layer, etc., and/or data from one or more sensors themselves to analyze conditions in the vehicle sensor data. The sensor fusion and RWM management layer 312 may be configured to detect conditions in the sensor data, such as sensor measurements being at, above, or below a threshold, certain types of sensor measurements occurring, etc., and may output the sensor data as part of the refined location and state information of the vehicle 101 provided to the behavior planning and prediction layer 316 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak brakes, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., network server 184); and/or owner/operator identification information.

The behavioral planning and prediction layer 316 of the autonomous vehicle system 300 may use the refined location and state information of the vehicle 101 and location and state information of other vehicles and objects output from the sensor fusion and RWM management layer 312 to predict future behaviors of other vehicles and/or objects. For example, the behavioral planning and prediction layer 316 may use such information to predict future relative positions of other vehicles in the vicinity of the vehicle based on own vehicle position and velocity and other vehicle positions and velocity. Such predictions may take into account information from the LDM data and route planning to anticipate changes in relative vehicle positions as host and other vehicles follow the roadway. The behavioral planning and prediction layer 316 may output other vehicle and object behavior and location predictions to the motion planning and control layer 314. Additionally, the behavior planning and prediction layer 316 may use object behavior in combination with location predictions to plan and generate control signals for controlling the motion of the vehicle 101. For example, based on route planning information, refined location in the roadway information, and relative locations and motions of other vehicles, the behavior planning and prediction layer 316 may determine that the vehicle 101 needs to change lanes and accelerate, such as to maintain or achieve minimum spacing from other vehicles, and/or prepare for a turn or exit. As a result, the behavior planning and prediction layer 316 may calculate or otherwise determine a steering angle for the wheels and a change to the throttle setting to be commanded to the motion planning and control layer 314 and DBW system/control unit 320 along with such various parameters necessary to effectuate such a lane change and acceleration. One such parameter may be a computed steering wheel command angle.

The motion planning and control layer 314 may receive data and information outputs from the sensor fusion and RWM management layer 312 and other vehicle and object behavior as well as location predictions from the behavior planning and prediction layer 316, and use this information to plan and generate control signals for controlling the motion of the vehicle 101 and to verify that such control signals meet safety requirements for the vehicle 101. For example, based on route planning information, refined location in the roadway information, and relative locations and motions of other vehicles, the motion planning and control layer 314 may verify and pass various control commands or instructions to the DBW system/control unit 320.

The DBW system/control unit 320 may receive the commands or instructions from the motion planning and control layer 314 and translate such information into mechanical control signals for controlling wheel angle, brake and throttle of the vehicle 101. For example, DBW system/control unit 320 may respond to the computed steering wheel command angle by sending corresponding control signals to the steering wheel controller.

In various embodiments, the wireless communication subsystem 330 may communicate with other V2X system participants via wireless communication links to transmit sensor data, position data, vehicle data and data gathered about the environment around the vehicle by onboard sensors. Such information may be used by other V2X system participants to update stored sensor data for relay to other V2X system participants.

In various embodiments, the platoon management system 300 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 316 (or in a separate layer) may determine the current or future separate distance between another vehicle (as defined by the sensor fusion and RWM management layer 312) and the vehicle (e.g., based on the world model refined by the sensor fusion and RWM management layer 312), compare that separation distance to a safe separation distance parameter stored in memory, and issue instructions to the motion planning and control layer 314 to speed up, slow down or turn if the current or predicted separation distance violates the safe separation distance parameter. As another example, safety or oversight, functionality in the motion planning and control layer 314 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 3B:
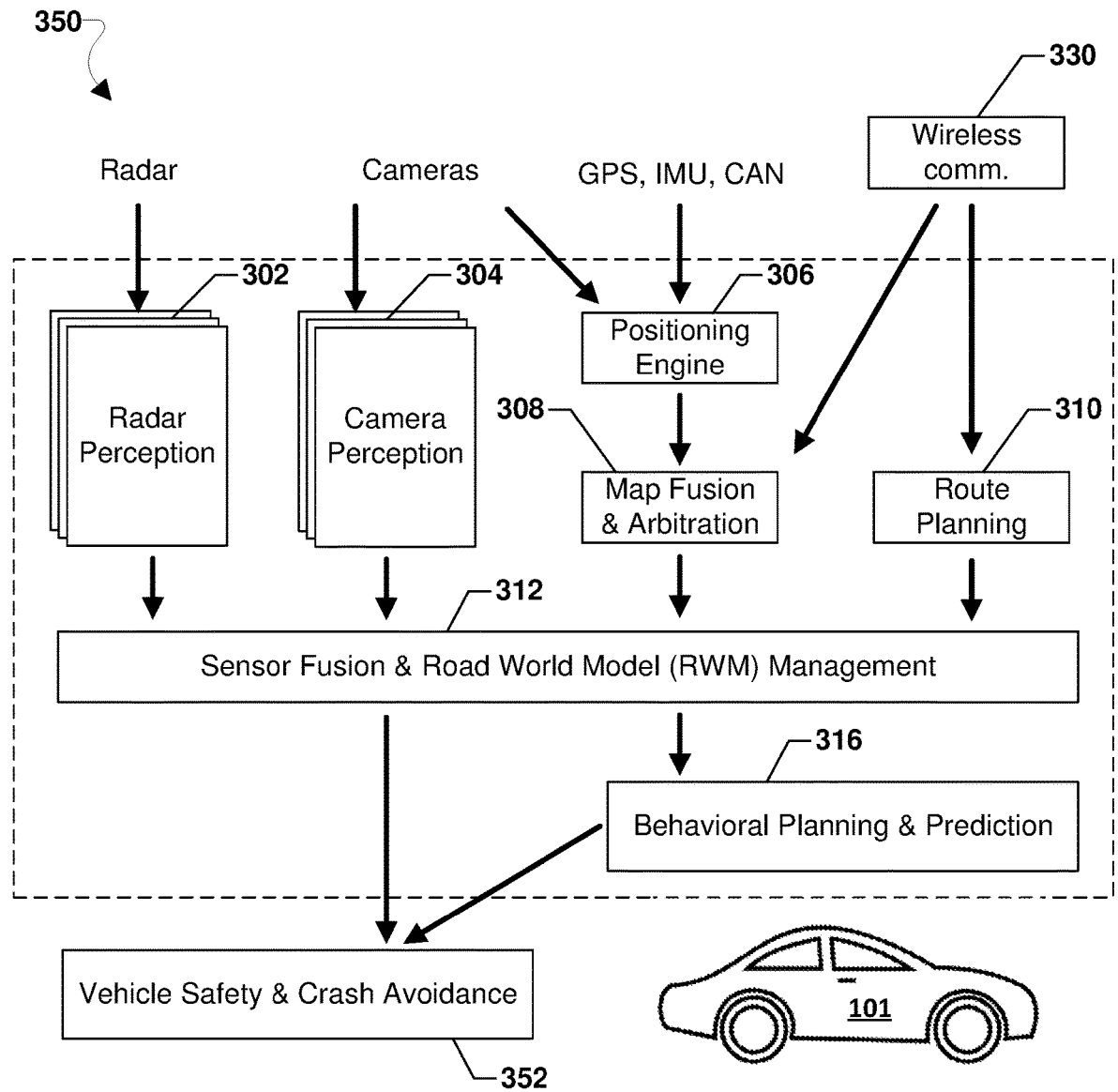
FIG. 3B is a component block diagram illustrating components of another example vehicle management system suitable for implementing various embodiments.

FIG. 3B illustrates an example of subsystems, computational elements, computing devices or units within a vehicle management system 350, which may be utilized within a vehicle 101. With reference to FIGS. 1A-3B, in some embodiments, the layers 302, 304, 306, 308, 310, 312, and 316 of the platoon management system 350 may be similar to those described with reference to FIG. 3A and the platoon management system 350 may operate similar to the platoon management system 300, except that the platoon management system 350 may pass various data or instructions to a vehicle safety and crash avoidance system 352 rather than the DBW system/control unit 320. For example, the configuration of the platoon management system 350 and the vehicle safety and crash avoidance system 352 illustrated in FIG. 3B may be used in a non-autonomous vehicle.

In various embodiments, the behavioral planning and prediction layer 316 and/or sensor fusion and RWM management layer 312 may output data to the vehicle safety and crash avoidance system 352. For example, the sensor fusion and RWM management layer 312 may output sensor data as part of refined location and state information of the vehicle 101 provided to the vehicle safety and crash avoidance system 352. The vehicle safety and crash avoidance system 352 may use the refined location and state information of the vehicle 101 to make safety determinations relative to the vehicle 101 and/or occupants of the vehicle 100. As another example, the behavioral planning and prediction layer 316 may output behavior models and/or predictions related to the motion of other vehicles to the vehicle safety and crash avoidance system 352. The vehicle safety and crash avoidance system 352 may use the behavior models and/or predictions related to the motion of other vehicles to make safety determinations relative to the vehicle 101 and/or occupants of the vehicle 101.

In various embodiments, the vehicle safety and crash avoidance system 352 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 352 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 352 may determine the current or future separate distance between another vehicle (as defined by the sensor fusion and RWM management layer 312) and the vehicle (e.g., based on the world model refined by the sensor fusion and RWM management layer 312), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 352 may compare a human driver's change in steering wheel angle to a safe wheel angle limit or parameter, and issue an override command and/or alarm in response to the steering wheel angle exceeding the safe wheel angle limit.

Figure 4:
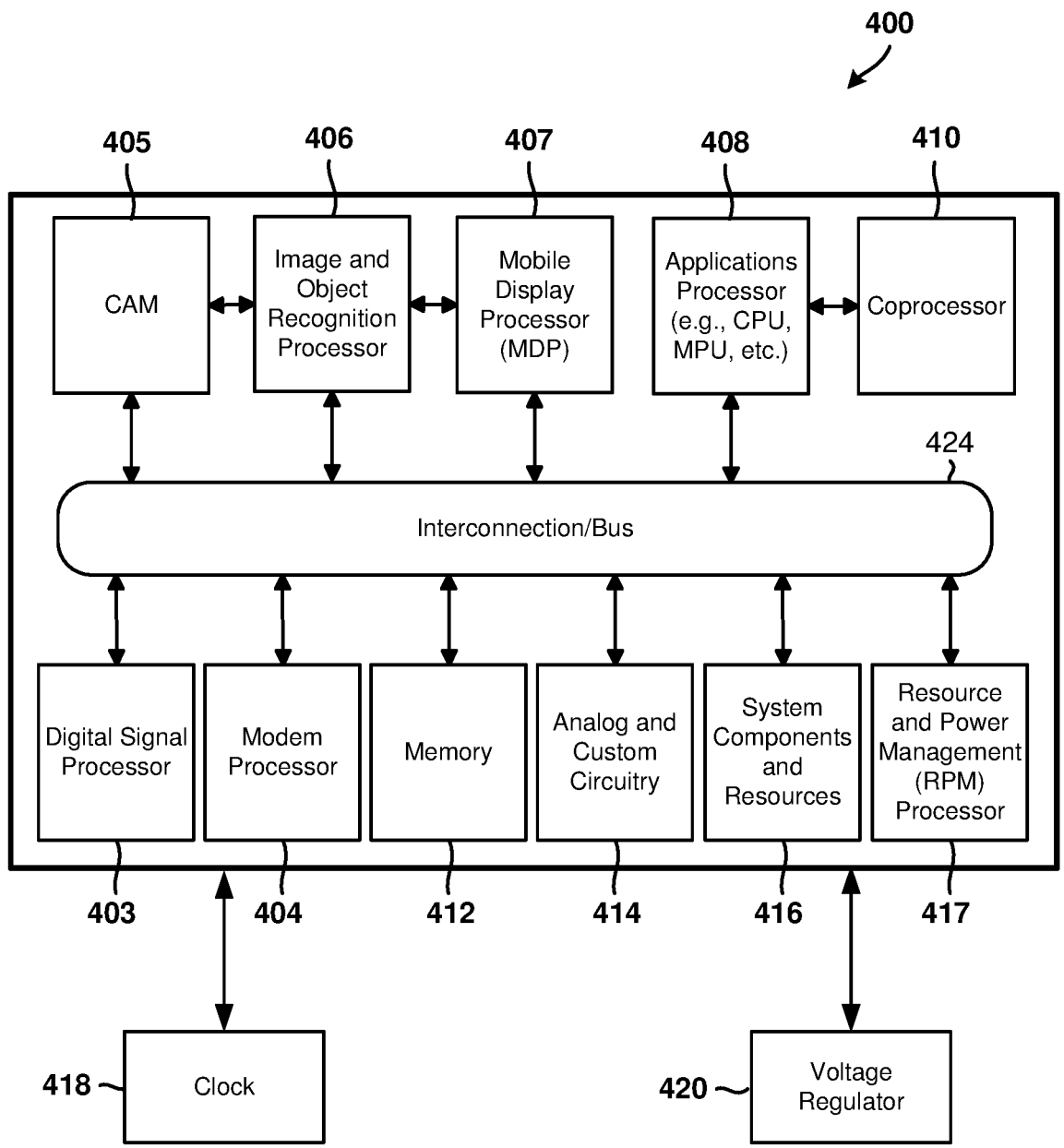
FIG. 4 is a block diagram illustrating components of a system on chip for use in a vehicle suitable for implementing various embodiments.

FIG. 4 illustrates an example system-on-chip (SOC) architecture of a processing device SOC 400 suitable for implementing various embodiments in vehicles. With reference to FIGS. 1A-4, the processing device SOC 400 may include a number of heterogeneous processors, such as a digital signal processor (DSP) 403, a modem processor 404, an image and object recognition processor 406, a mobile display processor 407, an applications processor 408, and a resource and power management (RPM) processor 417. The processing device SOC 400 may also include one or more coprocessors 410 (e.g., vector co-processor) connected to one or more of the heterogeneous processors 403, 404, 406, 407, 408, 417. Each of the processors may include one or more cores, and an independent/internal clock. Each processor/core may perform operations independent of the other processors/cores. For example, the processing device SOC 400 may include a processor that executes a first type of operating system (e.g., FreeBSD, LINUX, OS X, etc.) and a processor that executes a second type of operating system. (e.g., Microsoft Windows). In some embodiments, the applications processor 408 may be the SOC's 400 main processor, central processing unit (CPU), microprocessor unit (MPU), arithmetic logic unit (ALU), graphics processing unit (GPU), etc.

The processing device SOC 400 may include analog circuitry and custom circuitry 414 for managing sensor data, analog-to-digital conversions, wireless data transmissions, and for performing other specialized operations, such as processing encoded audio and video signals for rendering in a web browser. The processing device SOC 400 may further include system components and resources 416, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 400 also include specialized circuitry for camera actuation and management (CAM) 405 that includes, provides, controls and/or manages the operations of one or more cameras (e.g., 122, 136), such as a primary camera, webcam, 3D camera, etc., the video display data from camera firmware, image processing, video pre-processing, video front-end (VFE), in-line JPEG, high definition video codec, etc. The CAM 405 may be an independent processing unit and/or include an independent or internal clock.

In some embodiments, the image and object recognition processor 406 may be configured with processor-executable instructions and/or specialized hardware configured to perform image processing and object recognition analyses involved in various embodiments. For example, the image and object recognition processor 406 may be configured to perform the operations of processing images received from cameras (e.g., 122, 136) via the CAM 405 to recognize and/or identify other vehicles, and otherwise perform functions of the camera perception layer 304 as described. In some embodiments, the processor 406 may be configured to process radar or lidar data and perform functions of the radar perception layer 302 as described.

The system components and resources 416, analog and custom circuitry 414, and/or CAM 405 may include circuitry to interface with peripheral devices, such as cameras (e.g., 122, 136), radar (e.g., 132), lidar (e.g., 138), electronic displays, wireless communication devices, external memory chips, etc. The processors 403, 404, 406, 407, 408 may be interconnected to one or more memory elements 412, system components and resources 416, analog and custom circuitry 414, CAM 405, and RPM processor 417 via an interconnection/bus module 424, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 400 may further include an input/output module (not illustrated) for communicating with resources external to the SOC, such as a clock 418 and a voltage regulator 420. Resources external to the SOC (e.g., clock 418, voltage regulator 420) may be shared by two or more of the internal SOC processors/cores (e.g., the DSP 403, the modem processor 404, the image and object recognition processor 406, the MDP, the applications processor 408, etc.).

In some embodiments, the processing device SOC 400 may be includes a control unit (e.g., 140) for use in a vehicle (e.g., 101). The control unit may include communication links for communication with a telephone network (e.g., 180), the Internet, and/or a network server (e.g., 184) as described.

The processing device SOC 400 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

FIG. 5A illustrates a communication flow diagram of an example intra-platoon communication exchange using narrow-band communication links according to some embodiments. With reference to FIGS. 1A-5A, an intra-platoon data link 501 is illustrated being exchanged across three platoon member vehicles 101a, 101b, 101c. The intra-platoon data link 501 may convey control messages between the platoon member vehicles 101a, 101b, 101c. In particular, each platoon member vehicle 101a, 101b, 101c may initially receive control messages through the Wi-Fi communications/physical/medium access control layer (WiFi Phy/MAC layer). The front and rear WiFi stacks of each vehicle may be internally connected (either using the same processor or using a wired connection between two processors).

The control messages may then pass up through the network (N/W) layer and the data bus application layer before passing back through the N/W layer and the WiFi Phy/MAC layer before being passed along to the next platoon member vehicle through a narrow-band communication link. The application layer protocol may encapsulate different types of "platoon data bus packets" (e.g. CameraN frame, Control frame, Audio Announcement frame etc.), including the source identifier (e.g., vehicle ID and serial # in-platoon). Platoon data packets may be sent by the producer in both forward and rearward directions of the vehicle and each vehicle receiving the packets may forward those in the same way to the other end of the vehicle. In this way, each packet may be propagated in both directions to each platoon member vehicle. Upon receiving a platoon bus packet, the platoon bus application layer may inspect the packet to determine whether any particular platoon member vehicle (i.e., a node) is interested in the packet. If a platoon member vehicle is interested, that vehicle may copy and forward the packet to a subscribing application, otherwise that vehicle may simply forward the packet to the next vehicle.

Any control message (e.g., indicating a platoon member vehicle is braking, accelerating, or slowing) may have a special identifier. When such critical control message are forwarded along the intra-platoon wireless communication bus, each vehicle may be configured to immediately detect how critical that control message is and whether they need to process ("consume") the message instead of merely forwarding the message to the next vehicle in the platoon. For example, if a camera feed is part of a control message, the control message may provide each of the platoon vehicles with sufficient information to determine whether the camera feed is a front, rear, side, or other camera and from which platoon vehicle it originated. For example, different sensor resources may be identified within the control message.

In some embodiments, each platoon vehicle system may determine on its own whether it should consume any particular message that passes through it. For example, even though the settings of a particular vehicle indicate that a front camera view feed should not generally be displayed in-vehicle, a special event observable in that camera feed may trigger a special event notice, which may be embedded in the messaging. Such a special event notice may also allow that particular vehicle to better decide whether the special event should be used (e.g., displayed on an onboard screen). Also, under different conditions the special event may be treated differently, such as using contextual modifiers. For example, if a vehicle occupant is currently using an onboard display for navigation, a special event that is noncritical that would otherwise be displayed may not get displayed. As another example, if a camera on any platoon vehicle collects an image that identifies a rainbow, wildlife, or other notable condition, such an event may be flagged and indicated in the messaging for selective use by individual vehicles in the platoon. The selective use may be designated by user preferences, default settings, or other programming events. Thus, a vehicle processor may use contextual modifiers to determine whether a feed should be consumed (e.g., processed or presented on a display). Alternatively, a control message may identify a specific vehicle within the platoon, making that control message critical for that vehicle. All these decisions may occur at the data bus application layer.

Once the bus is formed and a lead vehicle applies the brakes, this information will be conveyed through the bus messaging and every vehicle will understand they must act upon it. In contrast, entertainment messaging may be optional. A Wi-Fi communication bus operating at, for example 60 GHz, may have a lot of bandwidth since there is not a lot of protocol overhead, which allows any bit of information to be quickly communicated across the entire communication bus, even along platoon.

The speed of communications along the Wi-Fi communication bus may be increased (i.e., latency may be kept down) if each vehicle in the platoon forwards information automatically at the WiFi PHY1/MAC layer, even before processing the information at higher layers.

Figure 5B:
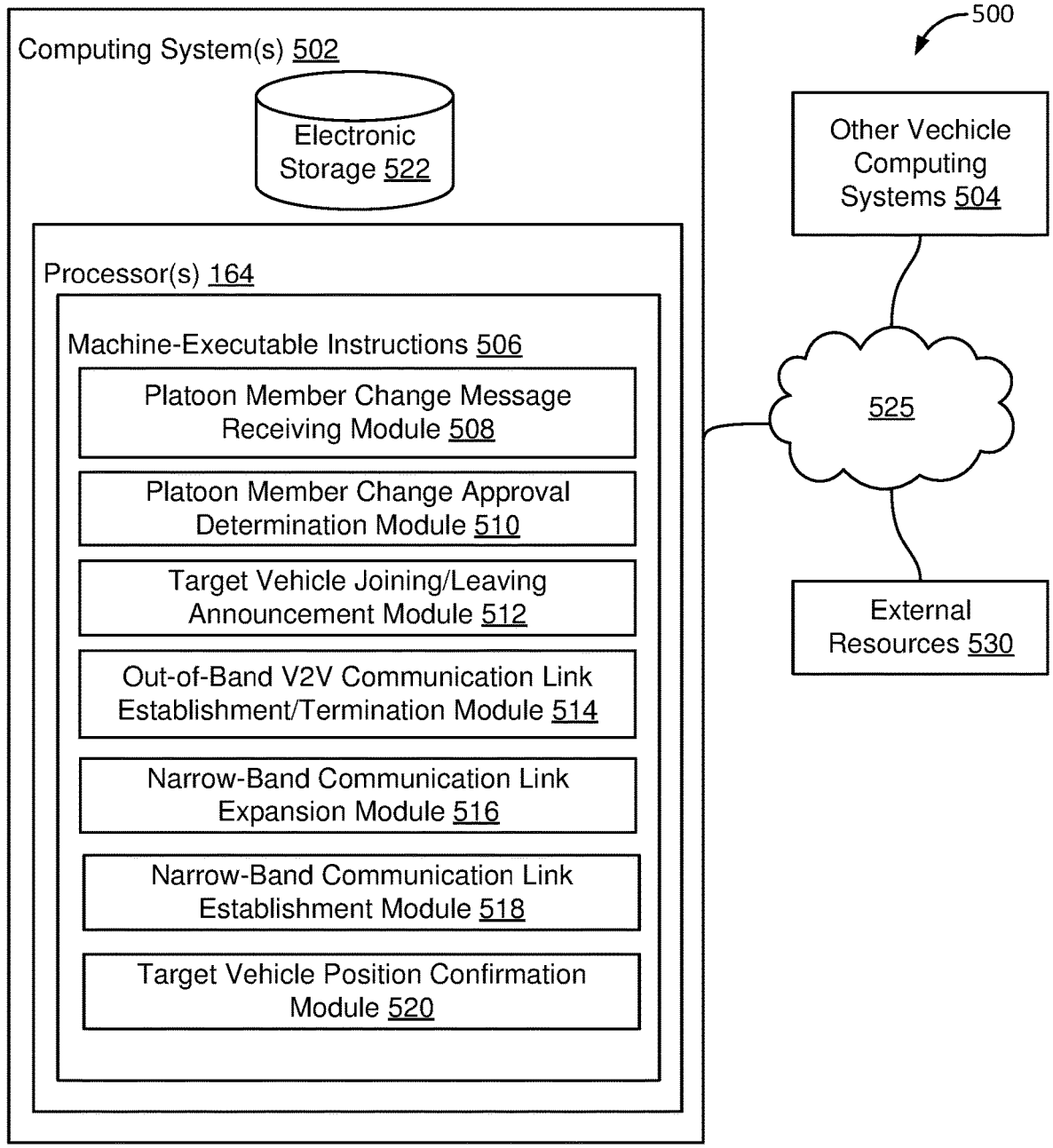
FIG. 5B is a component block diagram of an example system configured for changing a quantity of vehicles in a platoon according to various embodiments.

FIG. 5B shows a component block diagram illustrating a system 500 configured for collaboratively directing headlights by two or more vehicles in accordance with various embodiments. In some embodiments, the system 500 may include one or more vehicle computing systems 502 and one or more other vehicle computing systems 504 communicating via a wireless network. With reference to FIGS. 1A-5B, the vehicle computing system(s) 502 may include one or more processors 164, a processing device (e.g., 400), and/or a control unit (e.g., 104) (variously referred to as a "processor") of a vehicle (e.g., 101). The other vehicle computing system(s) 504 may include a processor (e.g., 164), a processing device (e.g., 400), and/or a control unit (e.g., 140) (variously referred to as a "processor") of a vehicle (e.g., 101).

The vehicle computing system(s) 502 may be configured via machine-executable instructions 506. Machine-executable instructions 506 may include one or more instruction modules. The instruction modules may include computer program modules. The instruction modules may include one or more of a platoon member change message receiving module 508, platoon member change approval determination module 510, target vehicle joining/leaving announcement module 512, out-of-band V2V communication link establishment/termination module 514, narrow-band communication link expansion module 516, narrow-band communication link establishment module 518 target vehicle position confirmation module 520, and/or other instruction modules.

The platoon ember change message receiving module 508 may be configured to receive, by a designated platoon vehicle processor, a platoon member change message indicating a requested change in the quantity of vehicles in the platoon. By way of non-limiting example, the platoon member change message may indicate that the target vehicle is not a member of the platoon and intends to join the platoon. Alternatively, as another non-limiting example, the platoon member change message may indicate that the target vehicle is a member of the platoon, but intends to leave the platoon.

The platoon member change approval determination module 510 may be configured to determine, by the vehicle processor, whether a change in the quantity of vehicles included in the platoon is approved. As a non-limiting example, the change in the quantity of vehicles included in the platoon may increase or decrease the quantity of vehicles in the platoon. The platoon member change approval determination module 510 may be configured to consider limits on the size of the platoon, based on various factors including current congestion on the roadway, the size of the vehicles in the platoon, predetermined limits on the size of a platoon under various conditions, etc. When determining whether a quantity of vehicles in the platoon should change, platoon member change approval determination module 510 may consider input provided by each vehicle, such as a destination, timing constraints, and/or a current position and velocity thereof. Selection of and changes to platoon formations may be determined according to a number of factors, such as the quantity of vehicles platooning or the road geometry. For example, a single lane road may be limited to a single in-line formation, while a highway with more than one lane may allow the platoon to form as a multi-lane cluster of vehicles. Also, the platoon need not utilize all the lanes available on a highway (e.g., leaving the left-most lane free for other vehicles to pass). As a further example, if fuel or energy efficiency is a priority for the platoon, an in-line, closely-spaced formation may be used to gain efficiencies from drafting. Similarly, one or more of the vehicles in the platoon may be directed to dim or turn off one or more of their headlights to minimize energy expenditures.

The target vehicle joining/leaving announcement module 512 may be configured to transmit messages informing members of the platoon that the quantity of vehicles will change. For example, the transmitted messages may specify details about a particular non-platoon vehicle that is preparing to join the platoon. Alternatively, the transmitted messages may indicate which one of the platoon member vehicles has elected to leave the platoon.

The out-of-band V2V communication link establishment/termination module 514 may be configured to either establish or terminate out-of-band V2V communication links. As a non-limiting example, the out-of-band V2V communication link establishment/termination module 514 may be configured to establish and/or terminate wireless communication channels using C-V2X, 4G, or 5G communication protocols.

The narrow-band communication link expansion module 516 may be configured to expand the first or second V2V communication links for maintaining communications with the initially-adjacent platoon vehicle, while changing a relative positioning between the designated platoon vehicle and the initially-adjacent platoon vehicle. For example, the width or range of the Wi-Fi signal may be increased to compensate for the greater distance between platoon vehicles as they make room for a newly inserted platoon vehicle.

The narrow-band communication link establishment module 518 may be configured to coordinate and manage all narrow-hand communication links. The narrow-band communication links may be used to maintain the intra-platoon wireless communication bus.

The target vehicle position confirmation module 520 may determine and confirm a position of a target vehicle relative to the platoon. The target vehicle position confirmation module 520 may use sensor data to accurately track target vehicle movements, particularly relative to platoon member vehicles.

Vehicles that participate in a platoon formation may need to be equipped with the platoon collaboration module or some equivalent thereof. In addition, platooning vehicles may require V2V communications capabilities, an ability to implement at least a core subset of the platoon control plan, communication protocols, and associated processing and maneuvering functions. Some vehicles may be capable and configured to take any role in the formation. Other vehicles may be constrained to a smaller range of roles within the formation based on vehicle equipment or driver/occupant characteristics.

In some embodiments, vehicle computing system(s) 502, other vehicle computing system(s) 504, and external resource(s) 530 may communicate with one another via a wireless network 525, such as V2V wireless communication links. Additionally, the vehicle computing system(s) 502 and other vehicle computing system(s) 504 may be connected to wireless communication networks that provide access to external resources 530. For example, such electronic communication links may be established, at least in part, via a network such as the Internet and/or other networks. It will be appreciated that this is not intended to be limiting, and that the scope of this disclosure includes embodiments in which the vehicle computing system(s) 502, the other vehicle computing system(s) 504, and/or the external resources 530 may be operatively linked via some other communication media.

The other vehicle computing system 504 ray also include one or more processors configured to execute computer program modules configured by machine-executable instructions, similar to the machine-executable instructions 506 of the computing system(s) 502. For example, the processors of the other vehicle computing system 504 may include machine-executable instructions similar to the platoon member change message receiving module 508, platoon member change approval determination module 510, target vehicle joining/leaving announcement module 512, out-of-hand V2V communication link establishment/termination module 514, narrow-band communication link expansion module 516, narrow-band communication link establishment module 518, target vehicle position confirmation module 520, and/or other instruction modules as described above.

External resources 530 may include sources of information outside of system 500, external entities participating with the system 500, and/or other resources. For example, external resource 530 may include map data resources, highway information systems, weather forecast services, etc. In some embodiments, some or all of the functionality attributed herein to external resources 530 may be provided by resources included in system 500.

Vehicle computing system(s) 502 may include electronic storage 522, one or more processors 164, and/or other components. Vehicle computing system(s) 502 may include communication lines, or ports to enable the exchange of information with a network and/or other vehicle computing system. The illustration of vehicle computing system(s) 502 in FIG. 5 is not intended to be limiting. Vehicle computing system(s) 502 may include a plurality of hardware, software, and/or firmware components operating together to provide the functionality attributed herein to vehicle computing system(s) 502. For example, vehicle computing system(s) 502 may be implemented by a cloud of vehicle computing systems operating together as vehicle computing system(s) 502.

Electronic storage 522 may comprise non-transitory storage media that electronically stores information. The electronic storage media of electronic storage 522 may include one or both of system storage that is provided integrally (i.e., substantially non-removable) with vehicle computing system(s) 502 and/or removable storage that is removably connectable to vehicle computing system(s) 502 via, for example, a port (e.g., a universal serial bus (USB) poll, a firewire port, etc.) or a drive (e.g., a disk drive, etc.). Electronic storage 522 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media flash drive, etc.), and/or other electronically readable storage media. Electronic storage 522 may include one or more virtual storage resources (e.g., cloud storage, a virtual private network, and/or other virtual storage resources). Electronic storage 522 may store software algorithms, information determined by processor(s) 164, information received from vehicle computing system(s) 502, information received from other vehicle computing system(s) 504, and/or other information that enables vehicle computing system(s) 502 to function as described herein.

Processor(s) 164 may be configured to provide information processing capabilities in vehicle computing system(s) 502. As such, the processor(s) 164 may include one or more of a digital processor, an analog processor, a digital circuit designed to process information, an analog circuit designed to process information, a state machine, and/or other mechanisms for electronically processing information. Although the processor(s) 164 is shown in FIG. 5 as a single entity, this is for illustrative purposes only. In some embodiments, processor(s) 164 may include a plurality of processing units. These processing units may be physically located within the same device, or processor(s) 164 may represent processing functionality of a plurality of devices operating in coordination. Processor(s) 164 may be configured to execute modules 508, 510, 512, 514, 516, 518, and/or 520, and/or other modules. Processor(s) 164 may be configured to execute modules 508, 510, 512, 514, 516, 518, and/or 520, and/or other modules by software; hardware; firmware; some combination of software, hardware, and/or firmware; and/or other mechanisms for configuring processing capabilities on processor(s) 164. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, and/or 520 are illustrated in FIG. 5 as being implemented within a single processing unit, in embodiments in which processor(s) 164 includes multiple processing units, one or more of modules 508, 510, 512, 514, 516, 518, and/or 520 may be implemented remotely from the other modules. The description of the functionality provided by the different modules 508, 510, 512, 514, 516, 518, and/or 520 described below is for illustrative purposes, and is not intended to be limiting, as any of modules 508, 510, 512, 514, 516, 518, and/or 520 may provide more or less functionality than is described. For example, one or more of modules 508, 510, 512, 514, 516, 518, and/or 520 may be eliminated, and some or all of its functionality may be provided by other ones of modules 508, 510, 512, 514, 516, 518, and/or 520. As another example, processor(s) 164 may be configured to execute one or more additional modules that may perform some or all of the functionality attributed below to one of modules 508, 510, 512, 514, 516, 518, and/or 520.

Figure 6A:
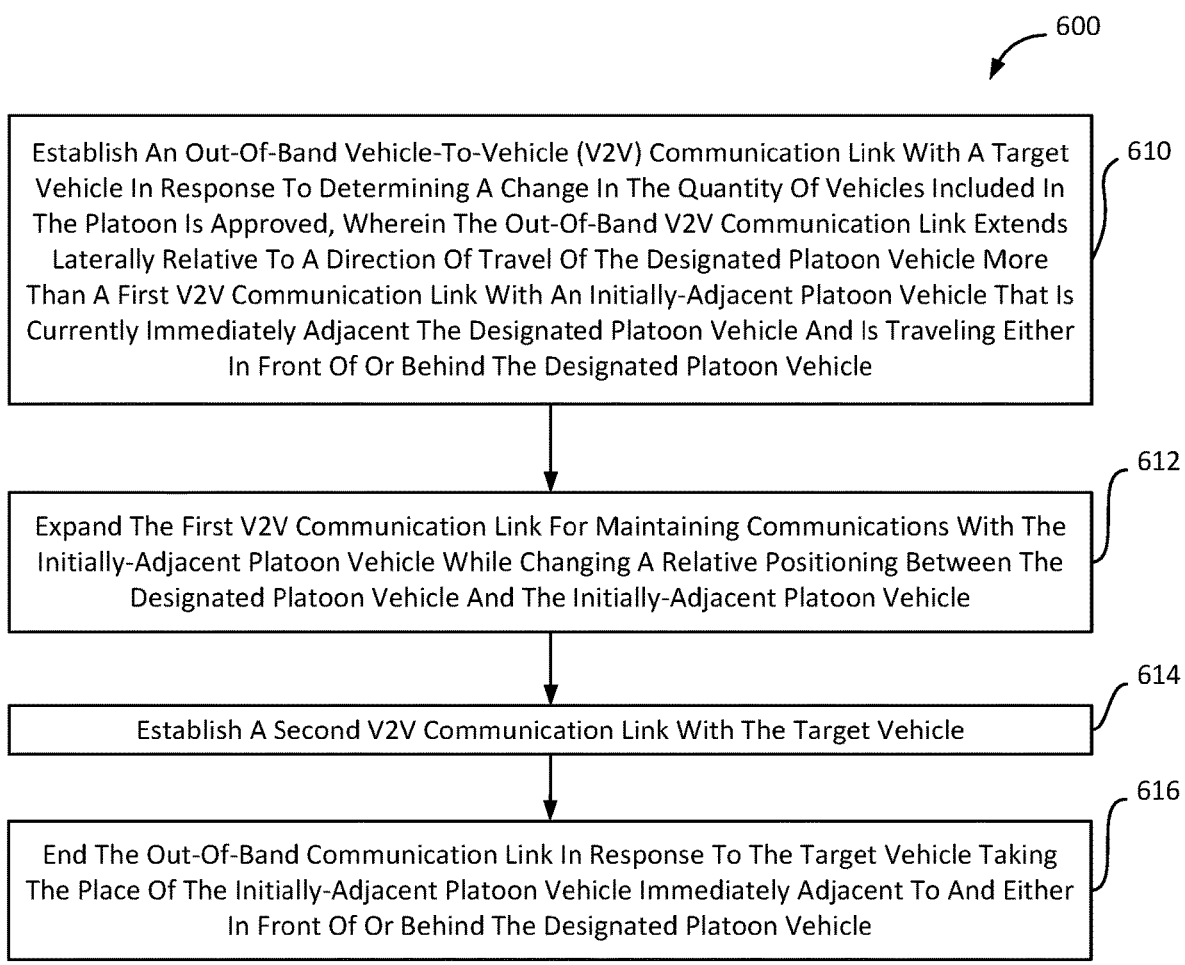
FIGS. 6A-6C are process flow diagrams of example methods for changing a quantity of vehicles in a platoon according to various embodiments.

FIG. 6A illustrates operations of a method for changing a quantity of vehicles in a platoon consistent with various embodiments. With reference to FIGS. 1A-6A, means for performing each of the operations of the method 600 may be one or more processor(s) of the vehicle (e.g., 101), such as the control unit (e.g., 140), the processor(s) (e.g., 164), the processing device(s) 300, 350, the SoC 400, and/or the like.

In block 610, the processor of the designated platoon vehicle may establish an out-of-band V2V communication link with a target vehicle in response to determining a change in the quantity of vehicles included in the platoon is approved. As discussed above, the out-of-band V2V communication link may extend laterally relative to a direction of travel of the designated platoon vehicle more than a first V2V communication link with an initially-adjacent platoon vehicle that is currently immediately adjacent the designated platoon vehicle and is traveling either in front of or behind the designated platoon vehicle. In some embodiments, the target vehicle may not be a member of the platoon when the out-of-band V2V communication link is established. In some embodiments, the target vehicle may already me a member of the platoon, is traveling either in front of or behind the designated platoon vehicle, and has indicated an intention to leave the platoon. In some embodiments, the designated platoon vehicle may use beam steering to establish and maintain the out-of-band V2V communication link.

In block 612, the processor of the designated platoon vehicle may expand the first V2V communication link for maintaining communications with the initially-adjacent platoon vehicle while changing a relative positioning between the designated platoon vehicle and the initially-adjacent platoon vehicle. In some embodiments, expanding the first V2V communication link may comprise changing the modulation scheme of the first V2V communication link. In some embodiments, expanding the first V2V communication link may comprise adjusting the first V2V communication link to widen a beam or lengthen an effective range of the first V2V communication link.

In block 614, the processor of the designated platoon vehicle may establish a second V2V communication link with the target vehicle. In some embodiments, the first and second V2V communication links may use a 60 GHz Wi-Fi frequency. In other embodiments, the second V2V communication link may have the same effective range as the first V2V communication link had before expanding. In some embodiments, at least one of the target vehicle and the designated platoon vehicle use beam steering for the second V2V communication link.

In block 616, the processor of the designated platoon vehicle may end the out-of-band communication link in response to the target vehicle taking the place of the initially-adjacent platoon vehicle immediately adjacent to and either in front of or behind the designated platoon vehicle.

Figure 6B:
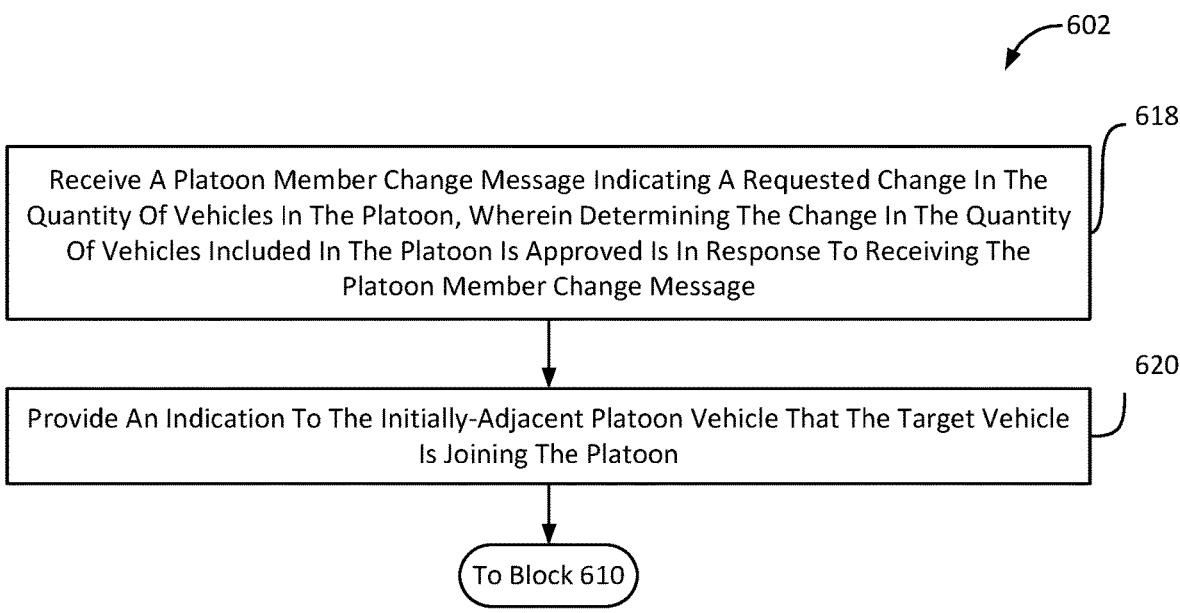

FIG. 6B illustrates operations of a method 602 for changing a quantity of vehicles in a platoon consistent with various embodiments. With reference to FIGS. 1A-6B, means for performing each of the operations of the method 602 may be one or more processor(s) of the vehicle (e.g., 101), such as the control unit (e.g., 140), the processor(s) (e.g., 164), the processing device(s) 300, 350, the SoC 400, and/or the like.

In block 618, the processor of the designated platoon vehicle may receive a platoon member change message indicating a requested change in the quantity of vehicles in the platoon. Also, determining that the change in the quantity of vehicles included in the platoon is approved may be in response to receiving the platoon member change message.

In block 620, the processor of the designated platoon vehicle may provide an indication to the initially-adjacent platoon vehicle that the target vehicle is joining the platoon.

Following the operations in block 620 in the method 602, the processor may establish an out-of-band V2V communication link with a target vehicle in block 610 of the method 600 as described.

Figure 6C:
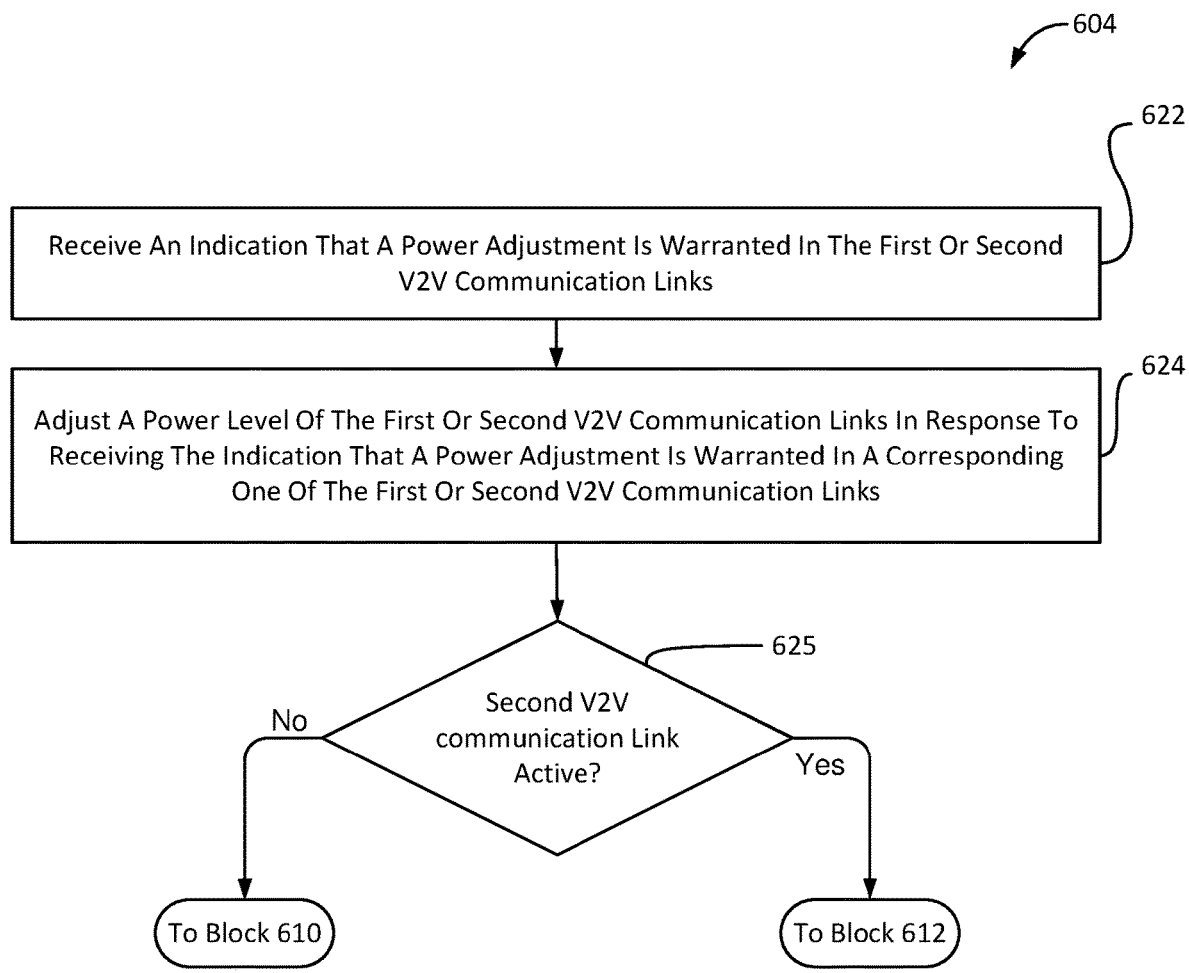

FIG. 6C illustrates operations of a method 604 for changing a quantity of vehicles in a platoon consistent with various embodiments. With reference to FIGS. 1A-6C, means for performing each of the operations of the method 604 may be one or more processor(s) of the vehicle (e.g., 101), such as the control unit (e.g., 140), the processor(s) (e.g., 164), the processing device(s) 300, 350, the SoC 400, the radio module (e.g., 172), the vehicle wireless communication subsystem (e.g., 330), and/or the like.

In block 622, the processor of the designated platoon vehicle may receive an indication that a signal power adjustment is warranted in the first or second V2V communication link. For example, the designated platoon vehicle may receive an indication of a signal degradation or loss in at least one of the first or second V2V communication links. Alternatively, the designated platoon vehicle may receive a message from another platoon vehicle (e.g., via the intra-platoon V2V communication link) conveying signal power optimization setting, which may indicate current power setting should be either increased or decreased. In addition, the received indication that a signal power adjustment is warranted may be provided through feedback from another platoon vehicle and/or a vehicle interested in joining the platoon.

In block 624, the processor of the designated platoon vehicle may adjust a power level of the first or second V2V communication links in response to receiving the indication that a power adjustment is warranted in a corresponding one of the first or second V2V communication links. For example, the adjustment may include an incremental increase or decrease in the power output used for the first or second V2V communication link. Alternatively, the adjustment may include a designated increase or decrease as indicated by the received indication that a signal power adjustment is warranted.

In determination block 625, the processor of the designated platoon vehicle may determine whether the second V2V communication link is active. For example, the processor of the designated platoon vehicle may check the status of current radio connections through the radio module (e.g., 172), the vehicle wireless communication subsystem (e.g., 330), and/or the like, which may indicate the communication links that are currently active (i.e., established and ongoing).

In response to determining that the second V2V communication link is not active (i.e., determination block 625="No"), the processor may establish an out-of-band V2V communication link with a target vehicle in block 610 of the method 600 as described.

In response to determining the second V2V communication link is active (i.e., determination block 625="Yes"), the processor may expand the first V2V communication link in block 612 of the method 600 as described.

Figure 7:
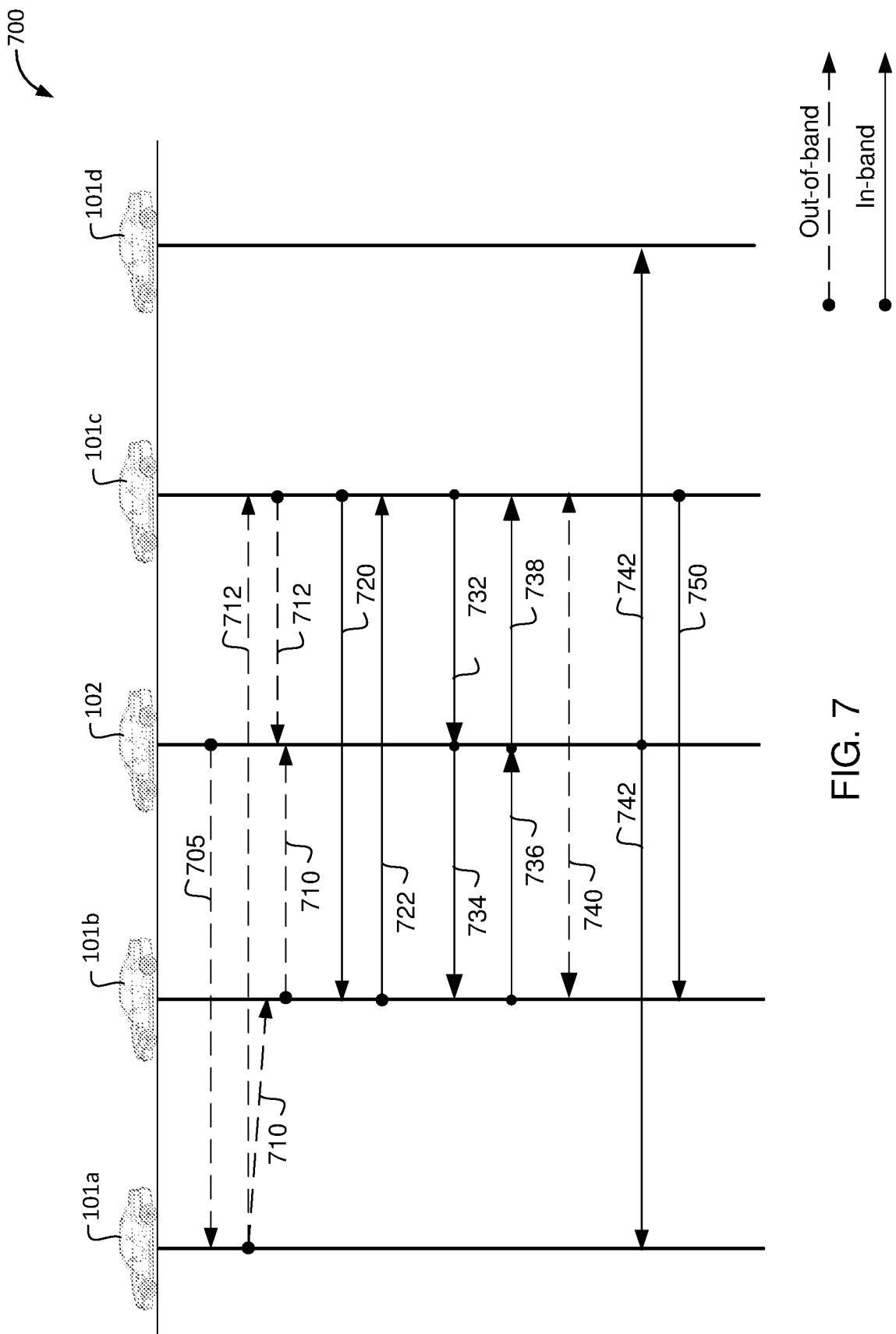
FIG. 7 is a communication flow diagram of example communication exchanges for changing a quantity of vehicles in a platoon according to some embodiments.

FIG. 7 illustrates a communication flow diagram of an example communication exchange 700 for adding a vehicle to a platoon by inserting the vehicle in between two existing platoon member vehicles according to some embodiments. With reference to FIGS. 1A-7, means for performing each of the operations of the communication exchange 700 may be one or more processor(s) of the vehicle (e.g., 101), such as the control unit (e.g., 140) including the radio module (e.g., 172) and/or wireless communication subsystem (e.g., 330), the processor(s) (e.g., 164), the processing device(s) 300, 350, the SoC 400, and/or the like.

The target vehicle 102 may transmit a request to join message 705 to any one of the platoon member vehicles 101a-101d in a platoon (e.g., 110). Using the intra-platoon wireless data bus, any platoon member vehicle that receives the request to join message 705 will pass the message along to the platoon leader 101a. The request to join message 705 may represent a request to be added to the existing platoon. The request to join message 705 may be transmitted as an out-of-band message, using for example C-V2X or a similar wireless communications links. The request to join message 705 may include detailed information about the target vehicle 102, including its position, velocity, destination, and other information useful for coordinating with a platoon of vehicles.

In response to receiving the request to join message 705, the platoon leader 101a may determine whether to allow the target vehicle 102 into the platoon such as by using the platoon member change approval determination module (e.g., 510). If the platoon leader 101a determines that the target vehicle 102 should be admitted into the platoon, the platoon leader 101a may identify the two platoon member vehicles nearest to the current position of the target vehicle 102. Those two nearest platoon member vehicles will be chosen to be the designated platoon vehicles (e.g., 101b, 101c) between which the target vehicle 102 a will be inserted. The platoon leader 101a may then transmit allowance messages 710, 712 to the two designated platoon vehicles 101b, 101c. As with the request to join message 705, the allowance messages 710, 712 may be transmitted as an out-of-hand message (e.g., C-V2X).

In preparation for the insertion of the added vehicle, the two designated platoon vehicles 101b, 101c may expand, and particularly extend, a range of the current narrow-band V2V communications between the two designated platoon vehicles 101b, 101c. Extending the range of the narrow-band V2V communications may help maintain a communication link between the two designated platoon vehicles 101b, 101c as they move further apart to make room for the target vehicle 102. The expansion of the current narrow-band V2V communications may be preceded with a range extending message 720, 722 communicated between the two designated platoon vehicles 101b, 101c.

Additionally, in preparation for the insertion of the added vehicle, the two designated platoon vehicles 101b, 101c may each establish additional separate narrow-hand V2V communications with the target vehicle 102. The narrow-band V2V communications may be established through an exchange of in-hand messages 732, 734, 736, 738 between the two designated platoon vehicles 101b, 101c and the target vehicle 102.

Once the new separate narrow and V2V communications between the two designated platoon vehicles 101b, 101c and the target vehicle 102 are complete, one or both of the designated platoon vehicles 101b, 101c may transmit a connection complete message 740. The connection complete message 740 may be an out-of-band message.

Once the target vehicle 102 is established as a platoon member, the target vehicle 102 may transmit bus announcement messages 742, in both directions of the intra-platoon wireless data bus to inform all platoon vehicles that the new vehicle insertion routine was successful.

In response to receiving the bus announcement message 742, one or both of the designated platoon vehicles 101b, 101c may transmit a disconnect message 750 to and the initial narrow-band V2V communication link between the two vehicles.

Figure 8:
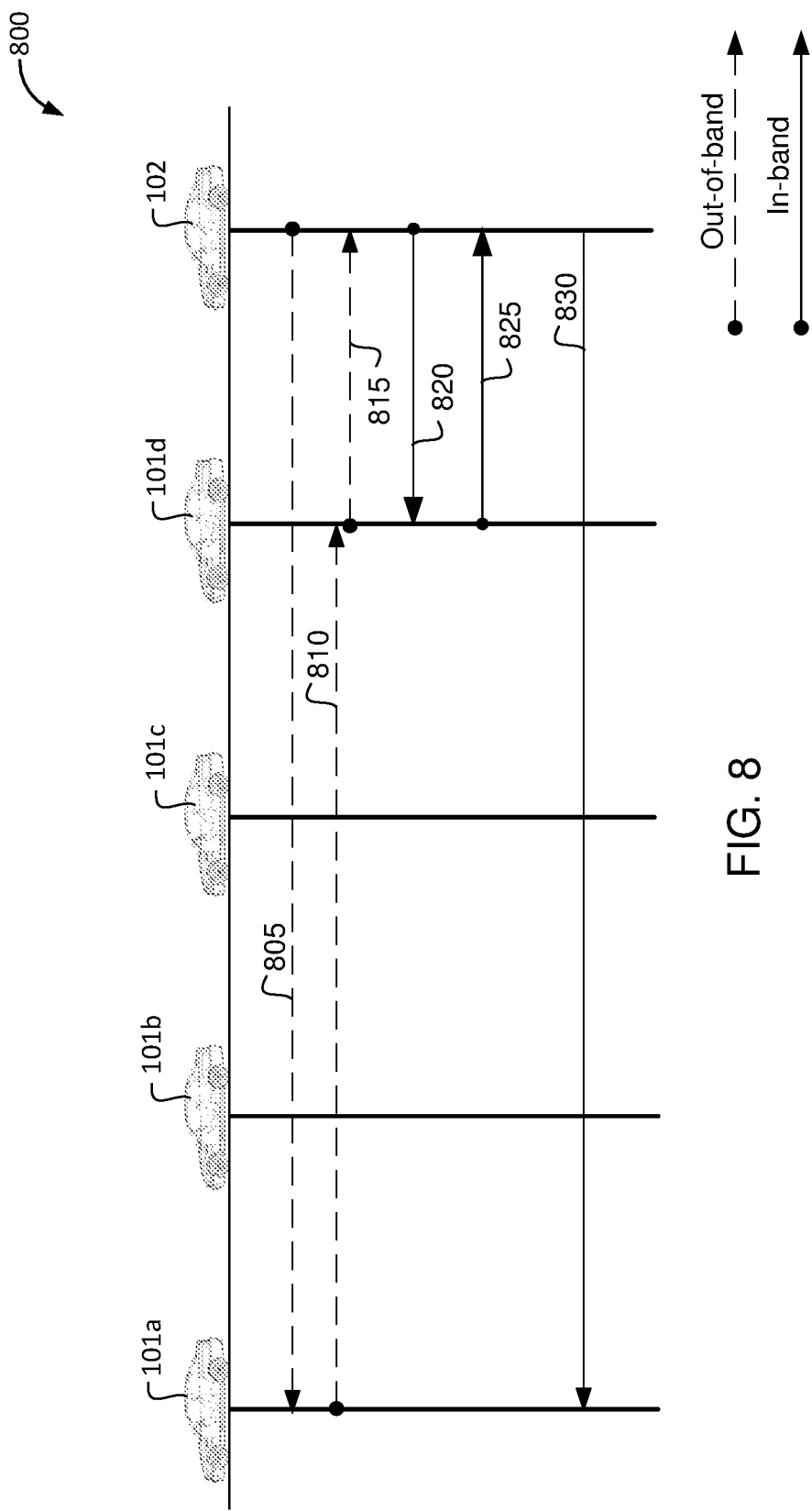
FIG. 8 is a communication flow diagram of example communication exchanges for changing a quantity of vehicles in a platoon according to some embodiments.

FIG. 8 is a communication flow diagram of an example communication exchange 800 for adding a vehicle to the tail end of a platoon according to some embodiments. With reference to FIGS. 1A-8, means for performing each of the operations of the communication exchange 800 may be one or more processor(s) of the vehicle (e.g., 101), such as the control unit (e.g., 140) including the radio module (e.g., 172) and/or wireless communication subsystem (e.g., 330), the processor(s) (e.g., 164), the processing device(s) 300, 350, the SoC 400, and/or the like.

Similar to the communication exchange 700, the communication exchange 800 may start with the target vehicle 102 transmitting a request to join message 805 to any of the platoon member vehicles 101a-101d in a platoon (e.g., 110). Using the intra-platoon wireless data bus, any platoon member vehicle that receives the request to join message 805 will pass the message along to the platoon leader 101a. The request to join message 805 may represent a request to be added to the existing platoon. The request to join message 805 may be transmitted as an out-of-band message, using for example C-V2X or a similar wireless communications links. Also, the request to join message 805 may include detailed information about the target vehicle 102, including its position, velocity, destination, and other information useful for coordinating with a platoon of vehicles.

In response to receiving the request to join message 805, the platoon leader 101a may determine whether to allow the target vehicle 102 into the platoon such as by using the platoon member change approval determination module (e.g., 510). If the platoon leader 101a determines that the target vehicle 102 should be admitted into the platoon, the platoon leader 101a may identify the two platoon member vehicles nearest to the current position of the target vehicle 102. In the example of the communication exchange 800 the target vehicle 102 is approaching from behind the platoon and may thus be added to the tail end thereof. With a tail end addition to the platoon, the platoon leader 101a may transmit an allowance message 810 to the last platoon member vehicle, which will be considered the designated platoon vehicle 101d. As with the request to join message 805, the allowance message 810 may be transmitted as an out-of-band message (e.g., C-V2X).

With the target vehicle being added to the tail end of the platoon, no expansion of the spacing between vehicles is needed. Thus, in response to receiving the allowance message 810, the designated platoon vehicle 101d may transmit a proceed to join message 815 to the target vehicle 102. The proceed to join message 815 may be transmitted as an out-of-band message (e.g., C-V2X).

Additionally, in preparation for adding the target vehicle 102 to the platoon, the designated platoon vehicle 101d and the target vehicle 102 may establish narrow-band V2V communications by exchanging in-band connection messages 820, 825.

Once the target vehicle 102 is established as a platoon member, the target vehicle 102 may transmit bus announcement messages 830 toward the front of the platoon using the intra-platoon wireless data bus to inform all platoon vehicles that the new vehicle insertion routine was successful.

Figure 9:
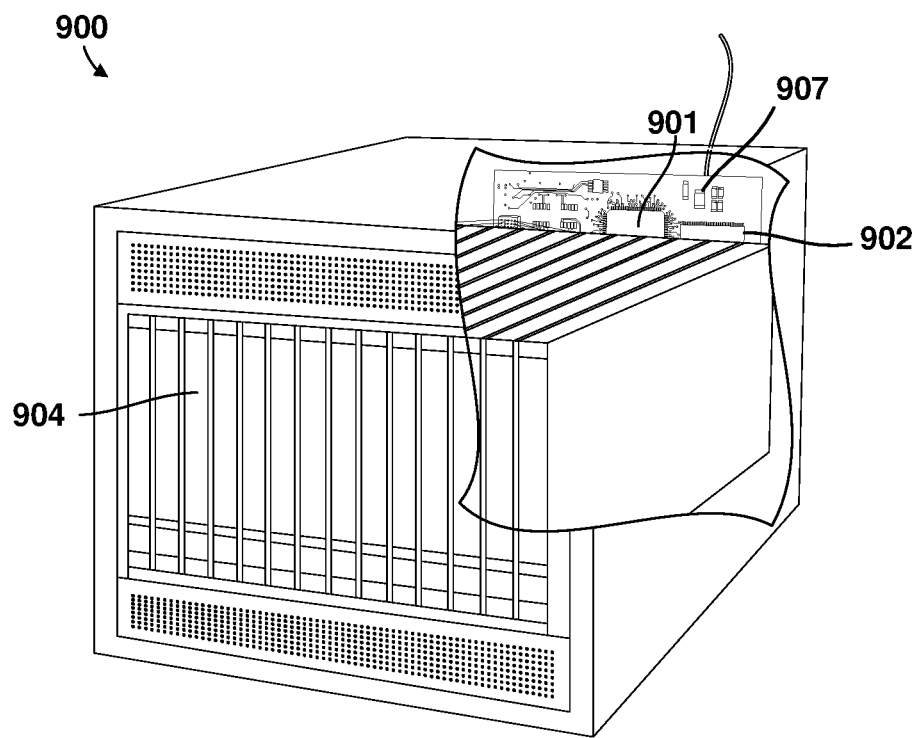
FIG. 9 is a component block diagram illustrating an example server suitable for use with various embodiments.

The various embodiments (including, but not limited to, embodiments described above with reference to FIGS. 1A-8) may by a variety of vehicle computing systems, an example of which is illustrated in FIG. 9. A vehicle computing system 900 typically includes one or more multicore processor assemblies 901 coupled to volatile memory 902 and a large capacity nonvolatile memory, such as a disk drive 904. As illustrated in FIG. 9, multicore processor assemblies 901 may be added to the vehicle computing system 900 by inserting them into the racks of the assembly. The vehicle computing system 900 may also include communication ports 907 coupled to the multicore processor assemblies 901 for exchanging data and commands with a radio module (not shown), such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

A number of different cellular and mobile communication services and standards are available or contemplated in the future, all of which may implement and benefit from Various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Implementation examples are described in the following paragraphs. While some of the following implementation examples are described in terms of example methods, further example implementations may include: the example methods discussed in the following paragraphs implemented by a V2X system processor that may be an onboard unit, mobile device unit, mobile computing unit, or stationary roadside unit including a processor configured with processor-executable instructions to perform operations of the methods of the following implementation examples; the example methods discussed in the following paragraphs implemented by a V2X system including means for performing functions of the methods of the following implementation examples; and the example methods discussed in the following paragraphs may be implemented as a non-transitory processor-readable storage medium having stored thereon processor-executable instructions configured to cause a V2X system processor to perform the operations of the methods of the following implementation examples.

Example 1. A method performed by a designated platoon vehicle for changing a quantity of vehicles in a platoon, including: establishing an out-of-band vehicle-to-vehicle (V2V) communication link with a target vehicle in response to determining a change in the quantity of vehicles included in the platoon is approved, wherein the out-of-band V2V communication link extends laterally relative to a direction of travel of the designated platoon vehicle more than a first V2V communication link with an initially-adjacent platoon vehicle that is currently immediately adjacent the designated platoon vehicle and is traveling either in front of or behind the designated platoon vehicle; expanding the first V2V communication link for maintaining communications with the initially-adjacent platoon vehicle while changing a relative positioning between the designated platoon vehicle and the initially-adjacent platoon vehicle; establishing a second V2V communication link with the target vehicle; and ending the out-of-band communication link in response to the target vehicle taking the place of the initially-adjacent platoon vehicle immediately adjacent to and either in front of or behind the designated platoon vehicle.

Example 2. The method of example 1, in which the target vehicle is not a member of the platoon when the out-of-hand V2V communication link is established.

Example 3. The method of example 1, in which the target vehicle is already a member of the platoon, is traveling either in front of or behind the designated platoon vehicle, and has indicated an intention to leave the platoon.

Example 4. The method of any of examples 1-3, in which expanding the first V2V communication link comprises changing the modulation scheme of the first V2V communication link.

Example 5. The method of any of examples 1-4, in which expanding the first V2V communication link comprises adjusting the first V2V communication link to widen a beam or lengthen an effective range of the first V2V communication link.

Example 6. The method of any of examples 1-5, further including: receiving a platoon member change message indicating a requested change in the quantity of vehicles in the platoon, wherein determining the change in the quantity of vehicles included in the platoon is approved is in response to receiving the platoon member change message; and providing an indication to the initially-adjacent platoon vehicle that the target vehicle is joining the platoon.

Example 7. The method of any of examples 1-6, in which the designated platoon vehicle uses beam steering to establish and maintain the out-of-band V2V communication link.

Example 8. The method of any of examples 1-7, in which the first and second V2V communication links use a 60 GHz Wi-Fi frequency.

Example 9. The method of any of examples 1-8, in which the second V2V communication link has the same effective range as the first V2V communication link had before expanding.

Example 10. The method of any of examples 1-9, in which at least one of the target vehicle and the designated platoon vehicle use beam steering for the second V2V communication link.

Example 11. The method of any of examples 1-10, in which the designated vehicle is either a lead vehicle or a trailing vehicle of the platoon.

Example 12. The method of any of examples 1-11, further including: adjusting a power level of the first or second V2V communication links in response to receiving an indication that a signal power adjustment is warranted.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a platoon vehicle for changing a quantity of vehicles in a platoon, comprising:

establishing an out-of-band vehicle-to-vehicle (V2V) communication link with a target vehicle in response to determining a change in the quantity of vehicles included in the platoon is approved, wherein the out-of-band V2V communication link extends laterally relative to a direction of travel of a designated platoon vehicle more than a first V2V communication link with an initially-adjacent platoon vehicle that is currently immediately adjacent the designated platoon vehicle and is traveling either in front of or behind the designated platoon vehicle, and wherein the designated platoon vehicle uses beam steering to establish and maintain the out-of-band V2V communication link;

expanding the first V2V communication link for maintaining communications with the initially-adjacent platoon vehicle while changing a relative positioning between the designated platoon vehicle and the initially-adjacent platoon vehicle;

establishing a second V2V communication link with the target vehicle; and ending the out-of-band V2V communication link in response to the target vehicle taking the place of the initially-adjacent platoon vehicle immediately adjacent to and either in front of or behind the designated platoon vehicle.

2. The method of claim 1, wherein the target vehicle is not a member of the platoon when the out-of-band V2V communication link is established.

3. The method of claim 1, wherein the target vehicle is already a member of the platoon, is traveling either in front of or behind the designated platoon vehicle, and has indicated an intention to leave the platoon.

4. The method of claim 1, wherein expanding the first V2V communication link comprises changing a modulation scheme of the first V2V communication link.

5. The method of claim 1, wherein expanding the first V2V communication link comprises adjusting the first V2V communication link to widen a beam or lengthen an effective range of the first V2V communication link.

6. The method of claim 1, further comprising:
receiving a platoon member change message indicating a requested change in the quantity of vehicles in the platoon, wherein determining the change in the quantity of vehicles included in the platoon is approved is in response to receiving the platoon member change message; and
providing an indication to the initially-adjacent platoon vehicle that the target vehicle is joining the platoon.

7. The method of claim 1, wherein the first and second V2V communication links use a 60 GHz frequency.

8. The method of claim 1, wherein the second V2V communication link has the same effective range as the first V2V communication link had before expanding.

9. The method of claim 1, wherein at least one of the target vehicle and the designated platoon vehicle use beam steering for the second V2V communication link.

10. The method of claim 1, wherein the designated platoon vehicle is either a lead vehicle or a trailing vehicle of the platoon.

11. The method of claim 1, further comprising:
adjusting a power level of the first or second V2V communication links in response to receiving an indication that a signal power adjustment is warranted.

12. A vehicle, comprising:
a wireless transceiver; and
a processor coupled to the wireless transceiver, wherein the processor is configured with processor-executable instructions to:
establish an out-of-hand vehicle-to-vehicle (V2V) communication link with a target vehicle in response to determining a change in a quantity of vehicles included in a platoon is approved wherein the vehicle uses beam steering to establish and maintain the out-of-band V2V communication link and the out-of-band V2V communication link extends laterally relative to a direction of travel of the vehicle more than a first V2V communication link with an initially-adjacent platoon vehicle that is currently immediately adjacent the vehicle and is traveling either in front of or behind the vehicle;

expand the first V2V communication link for maintaining communications with the initially-adjacent platoon vehicle while changing a relative positioning between the vehicle and the initially-adjacent platoon vehicle;

establish a second V2V communication link with the target vehicle; and end the out-of-band V2V communication link in response to the target vehicle taking the place of the initially-adjacent platoon vehicle immediately adjacent to and either in front of or behind the vehicle.

13. The vehicle of claim 12, wherein the processor is further configured with processor-executable instructions such that the target vehicle is not a member of the platoon when the out-of-band V2V communication link is established.

14. The vehicle of claim 12, wherein the processor is further configured with processor-executable instructions such that the target vehicle is already a member of the platoon, is traveling either in front of or behind the vehicle, and has indicated an intention to leave the platoon.

15. The vehicle of claim 12, wherein the processor is further configured with processor-executable instructions such that expanding the first V2V communication link comprises changing a modulation scheme of the first V2V communication link.

16. The vehicle of claim 12, wherein the processor is further configured with processor-executable instructions such that expanding the first V2V communication link comprises adjusting the first V2V communication link to widen a beam or lengthen an effective range of the first V2V communication link.

17. The vehicle of claim 12, wherein the processor is further configured with processor-executable instructions to:
receive a platoon member change message indicating a requested change in the quantity of vehicles in the platoon, wherein determining the change in the quantity of vehicles included in the platoon is approved is in response to receiving the platoon member change message; and
provide an indication to the initially-adjacent platoon vehicle that the target vehicle is joining the platoon.

18. The vehicle of claim 12, wherein the processor is further configured with processor-executable instructions such that the first and second V2V communication links use a 60 GHz frequency.

19. The vehicle of claim 12, wherein the processor is further configured with processor-executable instructions such that the second V2V communication link has the same effective range as the first V2V communication link had before expanding.

20. The vehicle of claim 12, wherein the processor is further configured with processor-executable instructions such that at least one of the target vehicle and the vehicle use beam steering for the second V2V communication link.

21. The vehicle of claim 12, wherein the processor is further configured with processor-executable instructions such that the vehicle is either a lead vehicle or a trailing vehicle of the platoon.

22. The vehicle of claim 12, wherein the processor is further configured with processor-executable instructions to:
adjust a power level of the first or second V2V communication links in response to receiving an indication that a signal power adjustment is warranted.

23. A vehicle, comprising:
means for establishing and maintaining an out-of-band vehicle-to-vehicle (V2V) communication link with a target vehicle using beam steering in response to determining a change in a quantity of vehicles included in a platoon is approved, wherein the out-of-band V2V communication link extends laterally relative to a direction of travel of the vehicle more than a first V2V communication link with an initially-adjacent platoon vehicle that is currently immediately adjacent the vehicle and is traveling either in front of or behind the vehicle;
means for expanding the first V2V communication link for maintaining communications with the initially-adjacent platoon vehicle while changing a relative positioning between the vehicle and the initially-adjacent platoon vehicle;
means for establishing a second V2V communication link with the target vehicle; and
means for ending the out-of-band V2V communication link in response to the target vehicle taking the place of the initially-adjacent platoon vehicle immediately adjacent to and either in front of or behind the vehicle.

24. The vehicle of claim 23, wherein the target vehicle is not a member of the platoon when the out-of-hand V2V communication link is established.

25. The vehicle of claim 23, wherein the target vehicle is already a member of the platoon, is traveling either in front of or behind the vehicle, and has indicated an intention to leave the platoon.

26. The vehicle of claim 23, further comprising:
means for receiving a platoon member change message indicating a requested change in the quantity of vehicles in the platoon, wherein determining the change in the quantity of vehicles included in the platoon is approved is in response to receiving the platoon member change message; and
means for providing an indication to the initially-adjacent platoon vehicle that the target vehicle is joining the platoon.

27. The vehicle of claim 23, further comprising:
means for adjusting a power level of the first or second V2V communication links in response to receiving an indication that a signal power adjustment is warranted.

28. A non-transitory processor-readable medium having stored thereon processor-executable instructions configured to cause a processor of a vehicle to perform operations comprising:
establishing an out-of-band vehicle-to-vehicle (V2V) communication link with a target vehicle in response to determining a change in a quantity of vehicles included in a platoon is approved, wherein beam steering is used to establish and maintain the out-of-band V2V communication link and the out-of-band V2V communication link extends laterally relative to a direction of travel of the vehicle more than a first V2V communication link with an initially-adjacent platoon vehicle that is currently immediately adjacent the vehicle and is traveling either in front of or behind the vehicle;
expanding the first V2V communication link for maintaining communications with the initially-adjacent platoon vehicle while changing a relative positioning between the vehicle and the initially-adjacent platoon vehicle;
establishing a second V2V communication link with the target vehicle; and
ending the out-of-band V2V communication link in response to the target vehicle taking the place of the initially-adjacent platoon vehicle immediately adjacent to and either in front of or behind the vehicle.

* * * * *